US011089662B2

(12) United States Patent
Brinkman et al.

(10) Patent No.: US 11,089,662 B2
(45) Date of Patent: Aug. 10, 2021

(54) ADAPTABLE LIGHTING CONTROLLER

(71) Applicants: Jonathan Brinkman, Key Largo, FL (US); Randy Perez, Key Largo, FL (US)

(72) Inventors: Jonathan Brinkman, Key Largo, FL (US); Randy Perez, Key Largo, FL (US)

( * ) Notice: Subject to any disclaimer, the term of this patent is extended or adjusted under 35 U.S.C. 154(b) by 0 days.

(21) Appl. No.: 16/392,598

(22) Filed: Apr. 23, 2019

(65) Prior Publication Data

US 2019/0254136 A1 Aug. 15, 2019

Related U.S. Application Data

(63) Continuation-in-part of application No. 15/423,545, filed on Feb. 2, 2017, now Pat. No. 10,270,954.

(60) Provisional application No. 62/290,404, filed on Feb. 2, 2016.

(51) Int. Cl.
| | |
|---|---|
| *H05B 33/08* | (2006.01) |
| *H05B 45/10* | (2020.01) |
| *G06F 3/0488* | (2013.01) |
| *G06F 3/023* | (2006.01) |
| *G06F 3/02* | (2006.01) |
| *H05B 45/00* | (2020.01) |

(52) U.S. Cl.
CPC ........... *H05B 45/10* (2020.01); *G06F 3/0202* (2013.01); *G06F 3/0238* (2013.01); *G06F 3/04886* (2013.01); *H05B 45/00* (2020.01)

(58) Field of Classification Search
CPC ............... H05B 33/0845; G06F 3/0202; G06F 3/04886; G06F 3/0238
See application file for complete search history.

(56) References Cited

U.S. PATENT DOCUMENTS

| | | | | |
|---|---|---|---|---|
| 8,299,719 B1 * | 10/2012 | Moshirnoroozi | .. | H05B 33/0806 315/185 R |
| 2011/0169419 A1 | 7/2011 | Matthews et al. | | |
| 2014/0300294 A1 * | 10/2014 | Zampini, II | ....... | H05B 33/0857 315/297 |

(Continued)

OTHER PUBLICATIONS

Walters et al, Scratch Controlling GPIO, 2014, The MagPi Ltd., The MagPi issue SE1, pp. 14-15. (Year: 2014).*

(Continued)

*Primary Examiner* — Evan P Dzierzynski
(74) *Attorney, Agent, or Firm* — Allen F. Bennett; Bennett Intellectual Property

(57) ABSTRACT

A LED controller device that regulates one or more light systems. The controller receives inputs from one or more sources and actuates one or more light systems in response to particular input signals. A software configuration tool is used to prepare or modify an operation profile such that it identifies a variety of different input signals and generates output signals in response to input signals. By altering the types of input signals identified by the controller, the controller is made compatible with several different types of devices regardless of manufacturer or types of signals the hardware produces. The controller may be contacted and controlled remotely or locally. The controller may be incorporated into the LED light strip, and is programmable using a jump wire.

6 Claims, 6 Drawing Sheets

(56) References Cited

U.S. PATENT DOCUMENTS

2016/0032545 A1* 2/2016 Lumsden .................. F21S 4/20
404/6
2016/0100465 A1 4/2016 Prescott et al.

OTHER PUBLICATIONS

Marsh, Buttons and Switches with the Raspberry Pi, 2014, The MagPi Ltd., The MagPi Issue SE1, pp. 80-87. (Year: 2014).*
Callaway, Garage Door Automation with WebIOPi, 2014, The MagPi Ltd., The MagPi Issue SE1, pp. 88-92 (Year: 2014).*
Adams, Raspberry Pi Model A+ Schematic, 2014, www.raspberrypi.org, rev 1.1 (Year: 2014).*
Data collection and telemetry system design for marine instrumentation: The Son-O-MERMAID Guevara, Donaldo. University of Rhode Island, ProQuest Dissertations Publishing, 2014. 1563550 (Year: 2014).*

* cited by examiner

ADAPTABLE LIGHTING CONTROLLER

CROSS-REFERENCE TO RELATED APPLICATIONS

This application is a continuation-in-part application of U.S. application Ser. No. 15/423,545 filed on Feb. 2, 2017, which issued as U.S. Pat. No. 10,270,954 on Apr. 23, 2019, and claims priority to U.S. Provisional Application Ser. No. 62/290,404 filed on Feb. 2, 2016.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of Endeavor

The present invention relates to systems and methods for controlling and maintaining vehicle access gates. More particularly, the invention relates to devices, systems and methods for controlling a lighting system attached to structures like gates, fences, doors, frames, piers, docks, boats, recreational vehicles and the like.

Background Information

Pivoting vehicle access gates have become commonplace in today's society. Paid parking locations and gated communities have become increasingly common. To control ingress and egress into these places by a vehicle, a pivoting access gate extending from a housing is often used to prevent or grant access to a location. Access gates typically have four positions. In the closed position, the access gate extends horizontally over a vehicle entrance about three or four feet above the ground and blocks access to the location. When entrance is permitted, the access gate pivots upward into a vertical open position. This movement is the second position, referred to herein as the opening position, and the vertical position is referred to herein as the open position. Once a vehicle has passed through it, the access gate translates through the closing position, returning to the closed horizontal position.

In the past, access gates were operated manually by a guard at the entrance. Today it is common for access gates to be automated, requiring no human operator. Persons wishing to enter a restricted parking area actuate the access gate using a radio frequency transmitter, pushing a button, scanning a barcode, swiping a card or key fob next to a signal detecting device or successfully making payment.

Unfortunately, due to their environments, access gates are subject to various hazards. Vehicle operators sometimes hit an access gate with their vehicle. On occasion, an access gate begins to descend into the closed position too soon, striking a vehicle. Severe weather can also damage an access gate. Furthermore, even the most robust equipment will eventually fail. Access gates are often used dozens or even thousands of times a day and various components will wear out.

When an access gate is damaged or dysfunctional, it must be repaired as soon as possible. However, it is often several hours or more before the manager of the access gate system becomes aware of damage. This is particularly problematic in the evenings. If an access gate ceases to function properly in the nighttime, the damage may not be discovered until the next morning, exposing the location to ingress by unwanted persons at the worst time, in the night.

To reduce the likelihood of damage, reflective material has been added to the exterior of an access gate. More recently, electric lighting systems have also been added. Some lighting systems are controlled such that one or more lights blink while the access gate is moving up or down and may use an alternate pattern when the access gate is fully open or fully closed. However the use of incandescent bulbs limited the colors and patterns available when using electric light to signal the status of a gate to oncoming traffic, pedestrians, trains and the like.

LED lighting systems have rapidly become ubiquitous and offer several advantages. They last much longer than incandescent bulbs, are smaller and typically more energy-efficient and generate less heat. They also come in a wide variety of colors. LED light strips have become increasingly common in all types of lighting situations. It has also become increasingly common to use various computer control systems with LED light strips to produce a wide variety of colors and patterns. By combining several LEDs on a single strip, a wide variety of colors and illumination patterns are easily achieved by only a single light strip.

For example, an access gate may have a light strip running along each side of it. When a gate arm is in an open up position, the light strips emit green light. When the gate arm is in the closed, down position, the light strips emit red light. As a gate arm transitions between the up and down position, it may flash green going up and red going down. Alternatively, it may flash yellow when going up and/or down. As owners of gate arms appreciate the versatility of computer-controlled LED light strips, the varieties and colors of patterns used for signaling become more apparent and more desirable. Generally, LED light strips receive signals from a computer device that instructed what colors and patterns to emit in different situations. These LED light strip controllers are generally provided with light strips and provide limited options. They are also generally designed for only a single application for LED light strips. LED light strips for use with a gate arm are controlled by a device or system completely different from a system used for controlling LED lighting on vehicles such as cars and trucks, which are different from control systems for boats, which are different from systems for access doors, track lighting, warehouse truck restraint systems and a plethora of other LED light strip applications. If a light strip is used for an application different from its originally intended purpose, the operator of the light strip typically must purchase a new light system controller, different software or both.

While the use of lighting and lighting utilizing different patterns of illumination have improved access gates and reduced the number of accidental collisions, they do not improve the maintenance of the access gates. Damage to an access gate is still not discovered until someone reports the damage or the manager of the access gate notices the damage. Furthermore, once damage is noticed, the source or cause of the damage is not necessarily obvious. Typically, a maintenance crew must be summoned to inspect and repair the access gate. The maintenance crew often has no idea what tools or equipment may be required to repair the damage or avoid future occurrences.

In view of the foregoing, there is a need to provide devices, methods and systems of controlling access gates, for example digitally controlling an access gate and the fencing lighting systems. It is also desirable to provide devices, methods and systems of expeditiously diagnosing damaged or dysfunctional access gates. It is also desirable to provide devices, methods and systems for monitoring usage of access gates and their components. It is also desirable to provide devices, methods and systems for improving the control and actuation of access gates in a variety of circumstances.

BRIEF SUMMARY OF THE INVENTION

Accordingly, the primary object of the present invention is to provide a ruggedized, industrial grade LED controller having software specific to the intended purpose for use with access gates, loading docks, fences, doorways and the like. In addition, it is an object of the invention to provide a LED controller that may be programmed with a customized operation profile.

In greater detail, a LED controller device regulates one or more light systems affixed to one or more of the devices listed above, or the like. The controller receives inputs from one or more sources and actuates one or more light systems in response to particular signals, or triggers. The controller also monitors and records usage of the light system and may also record usage of other devices acting in concert with the light systems and/or an access gate. A software configuration tool is used to prepare a gate operation profile that identifies triggering events and the actions the controller takes upon the occurrence of the triggering events. In this manner, different software allows the controller to be usable in many different contexts. The controller may be contacted and controlled remotely, locally over a cloud network or the like.

In one embodiment, a LED controller for an access gate has a logic board for managing logic circuits. Optionally, one or more power boards manage powered equipment in electrical communication with the logic board. The one or more power boards may not be integral to the LED controller of the invention. One or more lighting systems are in electrical communication with the logic board. One or more input devices are also in electrical communication with the logic board. A gate operation profile is created and/or selected by a configuration tool and is loaded onto the logic board. The gate operation profile has a list of triggering events and actions to be taken upon the occurrence of the triggering events.

In another embodiment, the logic board of the LED controller is remotely connected to a central receiving station via one-way or two-way communication. In a further embodiment, the LED controller is connected through the internet to a receiving station and a gate operation profile can be installed remotely through the internet connection. In a further embodiment, the LED controller can actuate external devices like an alarm and/or a surveillance camera upon the occurrence of a triggering event.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
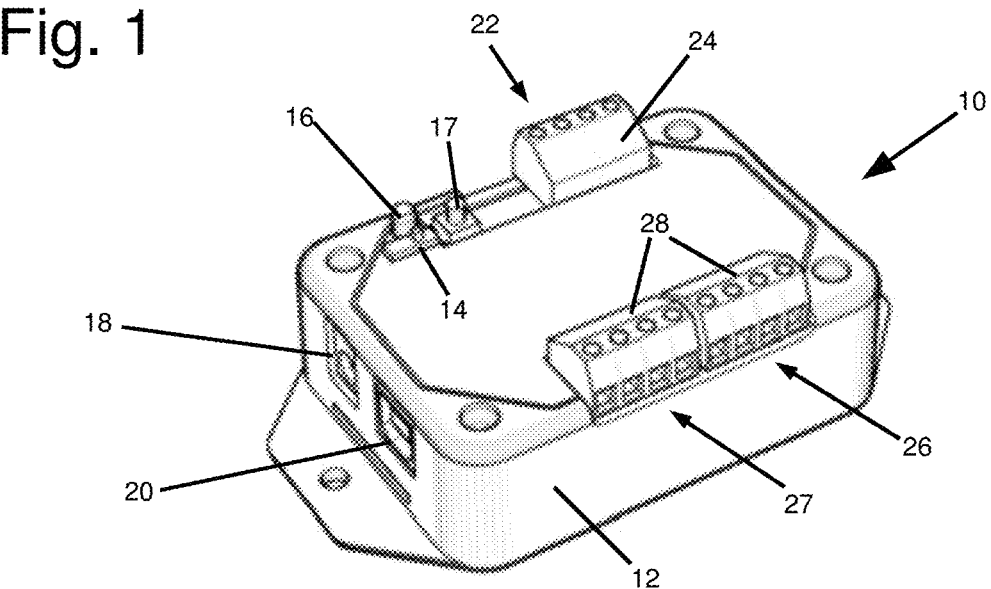
FIG. 1 is a perspective view of an LED controller in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims.

There are several terms of art used throughout this description. The meanings of these terms should be well understood by a person of ordinary skill in the art and/or by the context in which they are used. In general, the following terms shall have the following meanings unless the context of their use indicates otherwise. "Controller," "LED Controller" and "Light System Controller" are generally used interchangeably in the specification and all refer to a specialized device designed primarily to control lighting systems or arrays at various access points such as gate arms, garage doors, loading docks, and the like. Typically, a controller changes the light color and flashing pattern of one or more light arrays, such as an LED light strip, based upon the status of the access point. The controller receives a signal indicating a certain situation or event, and alters the light system color and pattern accordingly.

An "operation profile" refers to a list of rules or instructions used by an LED controller to send commands through its output ports to LED light strips or other devices in response to signals received at its input port or ports. Operation profiles are often represented by a runtime version of software compatible with an LED controller's operating system. A "configuration tool" refers to an authoring program that runs on the LED controller itself or on another computer device and is used to generate a runtime version representative of an operation profile. A "mobile device" refers to a laptop, tablet, smart phone or other portable device capable of connecting to an LED controller to assist in generating a runtime version representing an operation profile to an LED controller and saving the runtime version to the LED controller.

The disclosed LED controller in accordance with the principles of the invention is a programmable "system on a chip" that regulates one or more light systems or other DC output systems such as for example a horn affixed to a vehicle access gate, a dock locking system at a warehouse, safety door system, or other access signaling system. It is an always-on industrial device designed to live in harsh environments. All inputs and outputs are hardened against transient surges and lightning strikes. The controller is preferably conformally coated against moisture and contamination. The LED controller uses its own operating system to receive a variety of input signals from one or more sources and to actuate one or more LED light strips or other devices in response to particular signals or triggers. The LED controller is suitable for a wide variety of applications. It allows a wide variety of signals to be used as inputs and provides a wide variety of color and light blinking patterns to attached LED light strips or other LED lighting systems. The controller also is capable of incorporating other non-LED light strip devices that it may control, send signals to, adjust and/or supply power to, so long as those other non-LED devices are capable of being controlled using the types of output signals the LED controller can generate.

The controller may monitor and record usage data of the system and may also record usage of other devices acting in concert with the light systems and/or an access gate. One embodiment of the controller is also able to passively monitor other devices to detect and report failures or where unusual fluctuations in current and/or voltage. The LED controller may optionally provide power to one or more devices. The LED controller is also an entirely self-contained module. That is, it includes its own operating system, is directly programmable using a configuration tool on a separate mobile device, programmable using a simple jump wire, and may optionally include preconfigured, predefined operation profiles that may be used directly or modified according to an operator's preferences. Because the LED controller allows for its logic to be reprogrammed in a wide variety of ways to generate a wide variety of profiles, it may be readily adapted to many different uses with many different devices or systems.

The configuration tool may be stored on the LED controller itself, on a smart phone, tablet, computer or other device, or optionally accessible via an online portal. The configuration tool is used to create, modify and/or select a runtime version of an operation profile, which is saved on or transferred to the LED controller, thereby programming the controller to perform desired functions upon receiving preselected signals. Once a runtime version of a selected profile has been written using the configuration tool, which is essentially an authoring program, it is compiled into a runtime version of machine code and loaded onto the LED controller device. Transferring a created software profile onto the controller is preferably done via physical electrical communication, such as a USB port, but may also be performed by a Wi-Fi or Bluetooth connection. Optionally, a profile can be entered manually, e.g. using only a jump wire and a menu of different instructions by an operator in the field without access to a tablet, smartphone, or the like. Optionally, the LED controller may also be incorporated into a pre-existing system, e.g. a LED lighting control system, and used as an add-on module to passively monitor other devices and detect malfunctions and dysfunctions of various systems.

Optionally, the LED controller in accordance with the principles of the invention may be incorporated directly into an LED light strip, having a width similar to the width of the LED light strip. Due to the resulting size constraints, an LED controller incorporated into an LED light strip may only have sufficient storage to hold a single operation profile at a time, which can be permanent or replaceable using a computer device. An LED controller incorporated into an LED light strip may include additional modules such as an accelerometer to detect movement of the LED light strip. In such an embodiment, the light strip may be added to a gate arm and require no other input other than power. The accelerometer detects when a gate arm is moving up or down and generates a desired lighting pattern in response to the movement. Optionally, such an LED controller may be powered by a battery and have an inductive charging component that aligns with an inductive charger and is therefore completely separate from other electronics on the same device.

The invention also includes the use of a network of LED light controlling modules. A receiving station, such as a computer system at a maintenance station, may receive and record periodic updates from one or more of the LED controller devices in order to monitor the lifespan and durability of different components. The information may also be used to discern which access gates are damaged most frequently, which products are most reliable, which vehicle parking locations are most frequently compromised and other data. The LED controllers provide for more rapid notification of damage or dysfunction by or to an access gate and also provide a maintenance crew with relevant information regarding the types of repairs required. The data collected by the LED controller device may also be used to alert a maintenance crew or manager of a vehicle parking location to information indicating intentional damage, faulty products or improper access.

Figure 2:
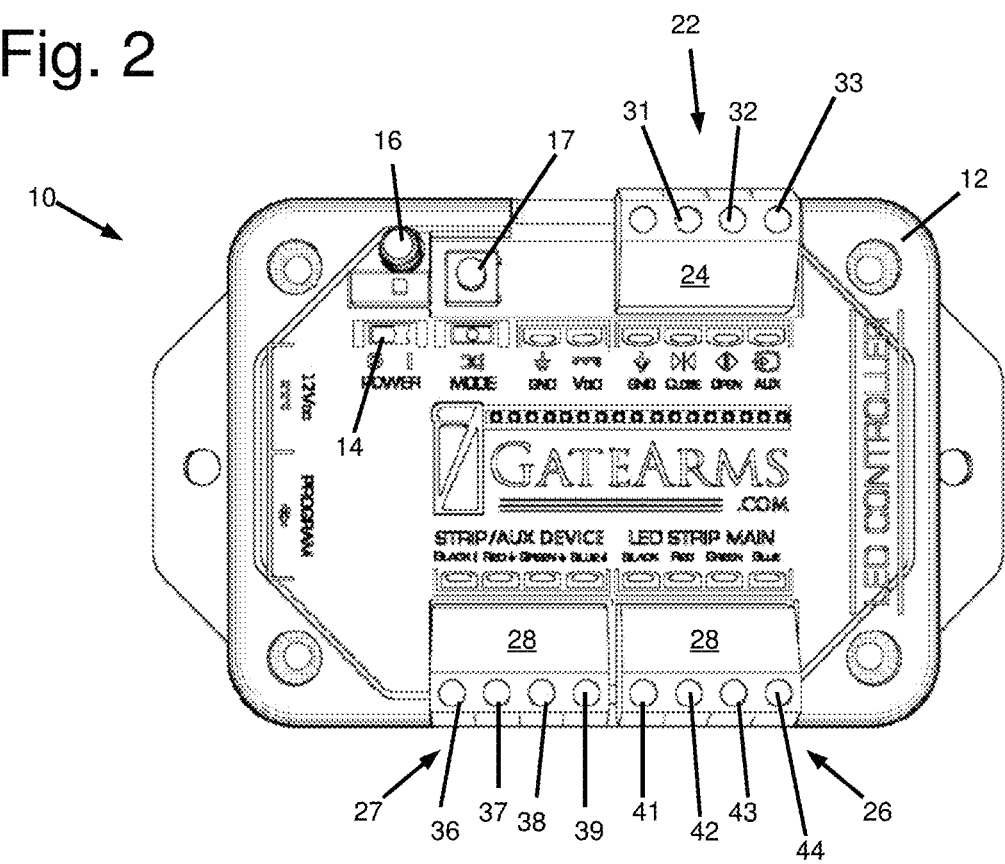
FIG. 2 is a top plan view of an LED controller in accordance with the principles of the invention.

FIGS. 1 and 2 show an LED controller 10 in accordance with the principles of the invention. In this embodiment, the LED controller 10 is housed within a durable casing 12. In this embodiment, the casing 12 is shock resistant and also fire resistant. The exterior of the casing 12 includes a power switch 14, a power indicator light 16 which is illuminated when the LED controller 10 is turned on, and a mode button 17. This embodiment of an LED controller 10 also includes a 12-24 V direct current power port 18. A connection port 20 is used to connect the LED controller 10 to a computer or mobile device on which the configuration tool is used to prepare a runtime version program for the LED controller 10. In this embodiment, the connection port 20 is a USB port, but other types of ports may optionally be used. Also optionally, the LED controller 10 may include components that provide communication with other devices.

The Controller 10 has intelligent user-programmable signal inputs. It can thus be adapted to understand a variety of signal conditions as configured by the user. These include up or down voltage changes and dry-contact relay connections. Those skilled in the art will appreciate that the position of a door, a gate arm or the status of a loading dock truck lock may be determined in different ways, resulting in different types of signals for the same status. The controller 10 may be programmed using the configuration tool to accept a wide variety of different electronic signals and to interpret those signals as programs by the configuration tool.

As may best be seen in FIG. 2, Controller 10 has a pin header 22 having three (3) individual, addressable input pins 31 (labeled "Close"), 32 (labeled "Open") and 33 (labeled "Aux"), each rated between 0 to 30 VDC. The Controller 10 also has user-programmable output pin headers, a main output header 26 (labeled "LED STRIP MAIN") and an auxiliary output header 27 (labeled "STRIP/AUX DEVICE"). The main output header 26 includes four (4) individual pins, three of which, 42, 43, and 44, are addressable output signal pins (labeled "Red," "Green," and "Blue," respectively). Similarly the auxiliary output header 27 includes four (4) individual output signal pins, three of which, 37, 38, and 39, are addressable output signal pins (also labeled "Red," "Green," and "Blue," respectively). In this embodiment, pins 37, 38, 39, 42, 43 and 44 are programmable open-drain pins and pins 36 and 41 are DC power pins. The controller 10 has a press-on header cover 24 providing a reliable connection between individual wires from input signaling devices to the four input pins of pin header 22. Similarly, press-on header covers 28 secure wires to the output pin headers 26 and 27.

Labels for the input and output pins on a controller may be helpful to an inexperienced technician when wiring a new system such as a gate arm. Labels, may be interchanged or altered. For example, the pins could be labeled with pure number or letters, or designated such as for example "Input 1" and "Output 1." Furthermore, the controller of the invention may be used with a variety of output devices other than LED lights strips. For example, the controller 10 may be used to actuate devices such as an audio alarm, a safety eye, a video camera, access control devices or the like.

The input pins of the header 22 allow the LED controller 10 to receive signals from external components such as a motor, photo electric eyes, garage door actuators, limit switches, passive devices for detecting voltage or current in a circuit that may or may not be in electrical communication with the LED controller 10 itself, and the like. The controller 10 can identify common types of electrical signals such as changes in voltage, reaching or exceeding a predetermined voltage, dry contacts, opening and closing of circuits, changes in current, reaching or exceeding a predetermined current and common limit switch signals.

When using Controller 10 to power LED light strips, an operation profile can be selected or made from scratch that can carefully control the colors and intensity during each stage of a series of events, as triggered by the input signals received at the input header 22. The colors can be controlled separately and/or simultaneously, so they can be blended into any color and can blink or be dimmed. For example, when mounted on a barrier gate arm, the stages include fully closed, opening, fully open, closing. The LEDs can be programmed by the user to be red when closed, flashing yellow when opening, green when fully open, and flashing red when closing. The controller can also be configured to use a countdown timer which reverts the color to default (solid red) after a set number of seconds. The transition effect, which blends one color smoothly into the next during a stage change, can be edited. There are also various technical settings that can be changed to adapt to nonstandard scenarios.

Because the Controller 10 is programmable, it can be modified to receive signals from a multitude of different devices from any manufacturer. It can also be used to receive and analyze more complex signals, such as status codes from safety sensors and repeating patterns that can be deconstructed into a Fourier series, and other electronic signals. The controller 10 can also be used to monitor circuits for voltage creep or detecting current leaking into a ground wire or other circuit. In addition, controller 10 can monitor its output signals and detect when a load has been removed. Because the controller is programmable using a configuration tool that can be accessed to change the operation profile using a portable device such as a mobile phone, the controller 10 can be readily modified to receive and transmit a wide variety of electronic signals.

The LED controller 10 may optionally include a storage module to record an activity log generated by the microcontroller to record performance data including malfunctions the LED controller 10 or the devices is connected to. This information may be transmitted to a receiving station. Optionally, the controller may include a removable flash memory or small storage drive on which a record log may be stored and which may then be removed periodically or may be stored in the local storage drive in the controller. The runtime version of an operation profile installed on the controller may monitor electrical activity in the circuits in order to detect malfunctions or dysfunctions such as input power failure or brownout, open and close signal failures, active motor problems such as stalling or operational difficulties, passive motor problems such as unusual or floating idle states, entrapment checks, watchdogs and other safety signals, telltale signs that the motor is failing and needs repair or replacement, dislocation or breaking of the access gate, and the like.

When one or more of these or other malfunctions are detected, the controller may send an alert signal to the central receiving station indicating that maintenance is required. The gate operation profile on the controller can also automatically engage other devices upon detecting certain events. For example, when the controller detects that the access gate has been dislocated, removed or broken, it could immediately activate a video camera and its microphone. The video recorded by the camera is then transmitted to the receiving station. Optionally, the controller may also activate an audio alarm and/or klaxon in response to an access gate being dislocated or broken. In one embodiment, the controller sends information relating to activity of the access gate as detected by means of the various input ports to the receiving station.

Figure 4:
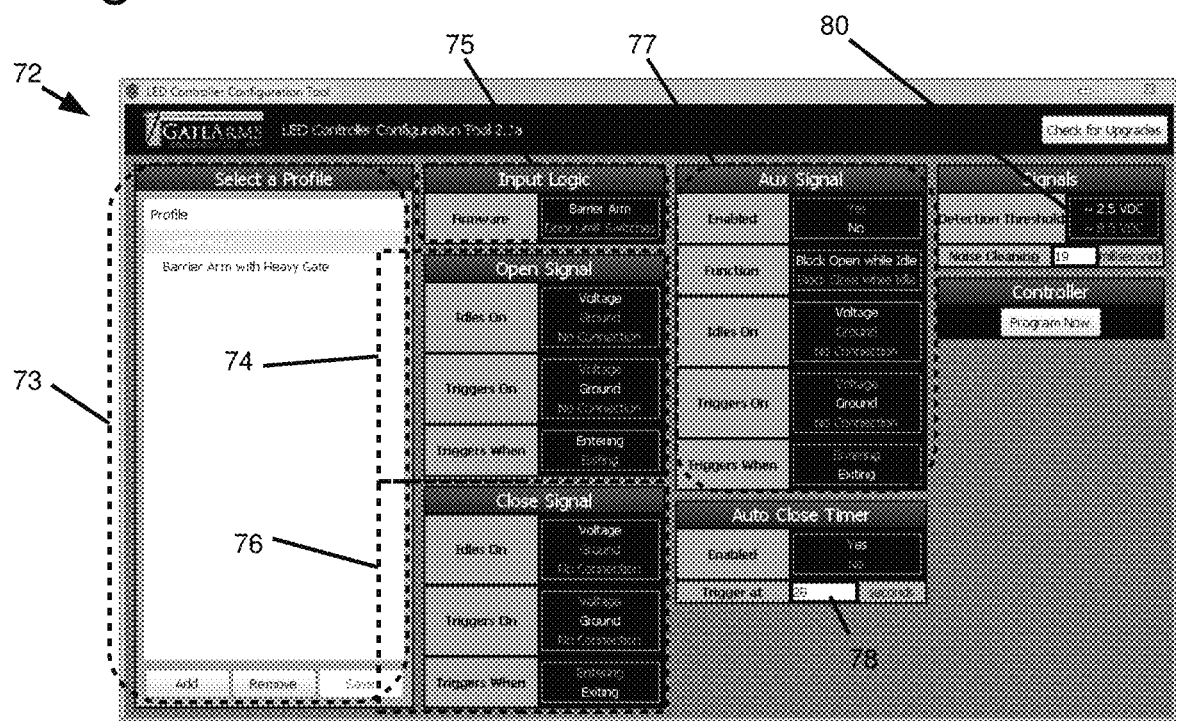
FIG. 4 is a graphic user interface of a configuration tool for an LED controller in accordance with the principles of the invention.

Another important aspect of the invention is a Configuration Tool. The Configuration Tool is used to select what input signals an LED controller will receive and what output signals it will generate in response to those inputs. The configuration tool 72 is a software authoring program and provide the method of configuring and operation profile as shown in FIG. 4. This allows a user to design an operation profile having specific functions desired by the user. Thus, an operator can define precise output signals. For example, if one of the output devices attached to an LED controller is an addressable LED light strip, an operation profile can be created that defines precise color and blinking patterns in the addressable LED strip. A user may also optionally select a previously prepared profile, or create a new customized profile. A user then selects parameters such as the occurrence of various events that will trigger an action by the LED controller. The user can also select the actions taken for each triggering event. Optionally, a user can also select the light and light patterns created by the light systems upon the occurrence of different events.

For example, as explained above, it may be desirable for a user to program the LED controller 10 to actuate an LED light strip to emanate a constant red light when a gate is in a closed position. The controller 10 may alter the LED lighting to emanate yellow light, in either a steady or blinking pattern, as a gate opens, lifting upward. When an access gate is fully open, the controller 10 may switch the color of the LED light strip to green lighting. When a gate begins to descend into a closed position, the controller 10 may again switch from green light to red light in a blinking pattern. The gate operation profile may also direct that a video camera be actuated when an access gate sustains a substantial impact or breaks off. The gate operation profile may also direct the controller 10 to send a warning signal if it detects a voltage drop below a predetermined level in the system or detects malfunctions in the motor or other components of a gate assembly.

Once a user has selected all of the desired triggering input signals and output signals to be generated for each input signal, a user creates a runtime version of the software by compiling the authored program directly into machine code. Machine code is saved on the LED Controller. The configuration tool will compile firmware dynamically based on the given profile configuration, minimizing the processing power required. This enhances the security of the system and makes it substantially more difficult to hack or disrupt operation of the LED controller.

By preparing customized gate operation profile software and installing it directly onto the logic board of the controller, a minimal amount of storage capacity is required. Furthermore, the simplicity of the programming minimizes the possibility of undesirable loops in the software or crashing of the system due to conflicting routines. Optionally, the configuration tool may be stored in the LED controller itself, is run on the controller's operating system, and accessed by a computer device.

In other embodiments, the controller's operation profile is wiped remotely and new gate operation profiles are loaded remotely as well. Optionally, an application on a smart phone may be used to load a new gate operation profile. The use of an access gate controller device and unique gate operation profiles also allows for the collection of substantial amounts of data. This may allow both the access gate owners and those responsible for maintenance to more quickly and accurately identified weaknesses in the access gate system and various components thereof.

A marine variant of the controller device may have a sealed NEMA 4× case that is fully waterproof. The marine variant may include a small control panel that can be mounted on a helm or dashboard. The controller may be used to control LED light strips on a boat or vehicle, and control the LED colors from their helm.

In one embodiment, the LED controller comprises a programmable "system on a chip" and has functionality substantially broader than simply controlling lighting. The LED controller is a programmable device which can be configured by the user to fully control the color and gesture behavior of one or more attached LED strips or other devices to be triggered by timers or external signals. The device may be used to control barrier gate arm lighting colors depending on the state of a gate operator using simple voltage change signals. The LED controller device may also be receptive to any kind of electrical signals, perform advanced lighting effects, work in harsh industrial environments, and operate in high or low voltage installations. The LED controller is a multipurpose programmable safety and recreational device primarily designed to intelligently control lighting and other devices. The LED controller is programmed using highly user configurable software allowing its adaptation into many new markets where currently no programmable lighting devices exist.

The LED controller may receive signals from one or more of configurable voltage or dry contact inputs, low and high changes in voltage in both AC and DC circuits, configurable trigger voltages, limit switches, and/or advanced digital signals such as status codes from safety sensors.

The LED controller can output several different signals, including pulse-width modulation outputs, switch external devices on or off, such as for example alarms and/or video cameras, powering support devices directly off output headers in order to programmatically turn them on or off, and advanced addressable LED strips. In addition, the LED controller can detect whether a load has been removed from its outputs. The LED controller of this embodiment is programmed using a configuration tool on a personal computer removably connected to the LED controller via a USB cord. Optionally, the LED controller can be accessed via a Bluetooth® or other wireless access mechanism.

The LED controller can function on very low voltages and less than 30 mA, suitable for being powered by a battery. The LED controller also can receive a wide range of AC and/or DC signals.

Because the configuration tool operates on a variety of computing platforms, it can be taken directly to a controller that is already installed at an access location. This allows a person installing or repairing the device to program it in situ. The configuration tool is easier to use than coding directly in machine language. The configuration tool works in multiple languages, on multiple platforms, and on multiple types of computer devices, such as personal computers, laptops, tablets and smartphones. This additional processing power also allows the configuration tool to take the form of an extremely user-friendly program that allows a person inexperienced in programming to create very sophisticated instructions for an LED controller. Optionally, the configuration tool, including all of the various profile types modifications thereto, may be stored on the LED controller.

Another advantage of the present invention is that it may be quickly and easily programmed to control practically any type of hardware regardless of manufacturer. Currently, light system controllers are manufactured and sold that conform to only a specific system. If the operator of a parking garage replaces gate arm hardware, he or she must discard the controller for the old hardware and purchase a controller for the new hardware. If an access system repair person is called to repair a gate arm or garage door, he or she must have on hand a wide array of different controllers from different manufacturers specific to different systems. Furthermore, if a single manufacturer sells both gate arms and garage doors, these two different types of systems require their own distinct controller. As a result, a repair person must have on hand a wide variety of controllers in order to adequately service the many different types of devices out there. The present invention provides a controller that may be programmed to receive any type of electrical signal input and may therefore be programs to function with any type of hardware. In addition, the controller may be used for different types of access systems. The same controller can be used to control light systems for gate arms, garage doors, warehouse loading dock truck locks and any other system whether a lighting pattern changes according to different circumstances. Thus, an access device repair person need only carry one type of controller, the controller provided herein.

Existing LED controllers typically allow a user limited options to select various colors, color sequences and patterns in which the colors alternate, blinking speeds and other relatively simplistic programs. However, their functionality is limited due to the limited size and capability of the microcontroller in the device. The present invention does not suffer these drawbacks. The configuration tool of the present invention allows a user to select one of several possible preconfigured LED controller profiles, or to create his or her own unique profile. For example, advanced fully addressable LED light strips are capable of being adjusted to produce practically any color on the spectrum. However, more complicated patterns and colors require more complicated and more numerous lines of code. Even with today's microcircuits, it is impractical to store interpreting software and/or compiling software along with various runtime libraries and an operating system and a microcontroller. Because the configuration tool is run on a larger or more robust computer system, it may utilize authoring software design for very unsophisticated "programmers" which it may then interpret and compile a single runtime version from a vast library.

Figure 3:
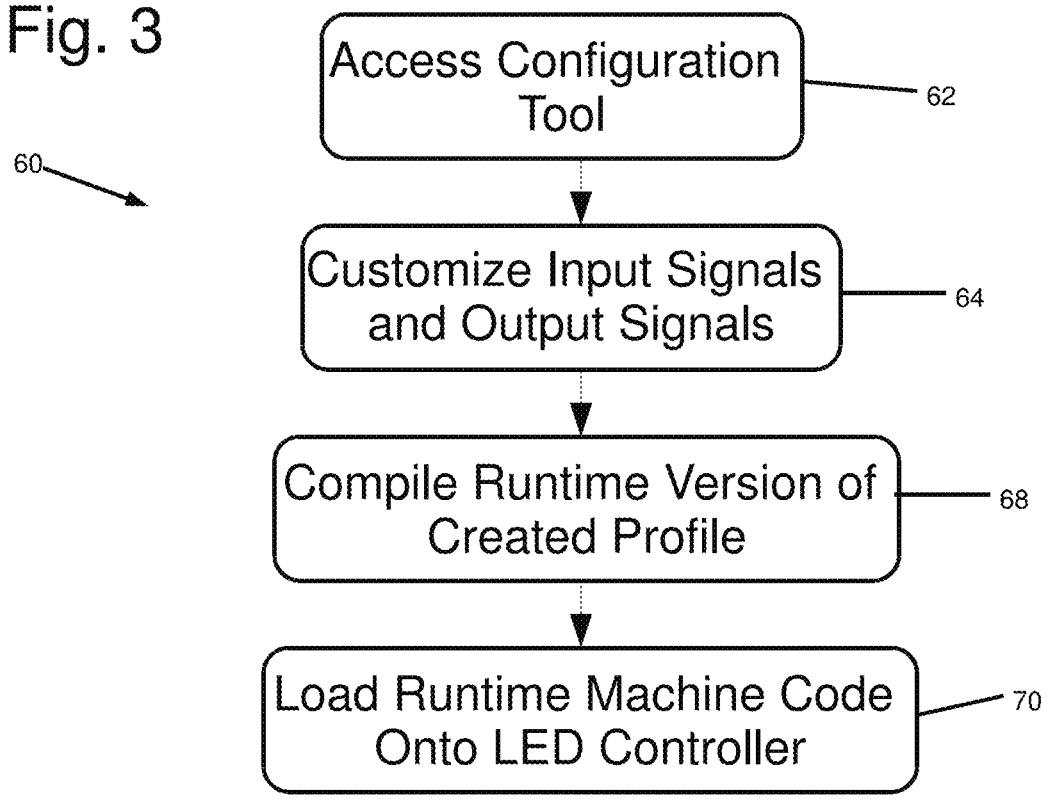
FIG. 3 is a flowchart showing the preparation of an LED controller profile in accordance with the principles of the invention.

FIG. 3 shows a flowchart 60 of a typical method for preparing a runtime version of an LED controller profile in accordance with the present invention. First, a user accesses the configuration tool 62. In this embodiment, the configuration tool is a software program stored on the hard drive of a personal computer. Optionally, the configuration tool may be accessed through an online portal or a different platform. The user then customizes the input signals and output signals 64. The access configuration tool includes a number of profiles for common uses of an LED controller.

FIG. 4 shows a graphic user interface 72 of a configuration tool in accordance with the principles of the invention. In this embodiment, the user interface 72 identifies the particular configuration tool as "LED Controller Configuration Tool 2.1a." When the configuration tool 72 is run on a mobile device, such as a laptop, tablet or smart phone, and is connected to the controller through a USB port or wirelessly, the graphic user interface 72 displays the programming options available, including programming options for the input and output pins. In this embodiment, the graphic user interface 72 as it appears when connected to controller 10 via USB port 20. The Profile Selection box 73 allows the user to select from one or more basic profiles. In this example, the user has selected the profile titled "Barrier Arm." The Input Logic box 75, indicates the "Barrier Arm" logic parameters have been selected. The Open Signal box 74 corresponds to the "open" input pin 31. Here, open input pin 31 is configured to interpret the presence of a voltage as an "idle" status, when no action is taken. The open input pin 31 interprets a temporary voltage drop to "ground" as a signal that a gate arm has opened. The "close" input pin 32 is displayed as the "Close Signal" box 76. It also shows that the runtime version of the operating software is set such that the close input pin 32 reads a voltage as an idle status and that a drop to ground is interpreted as a signal that the gate arm is closing. In this example of a graphic user interface, there is no programming for the input pin 33. However, it does include a timer 78 that may be set and a voltage signal threshold box 80 that allows a user to adjust the threshold voltage for the signals received by the input pins. In this embodiment, the Aux Signal, which may be used to monitor another device, is not enabled, as shown in the Aux Signal Box 77.

Figure 5:
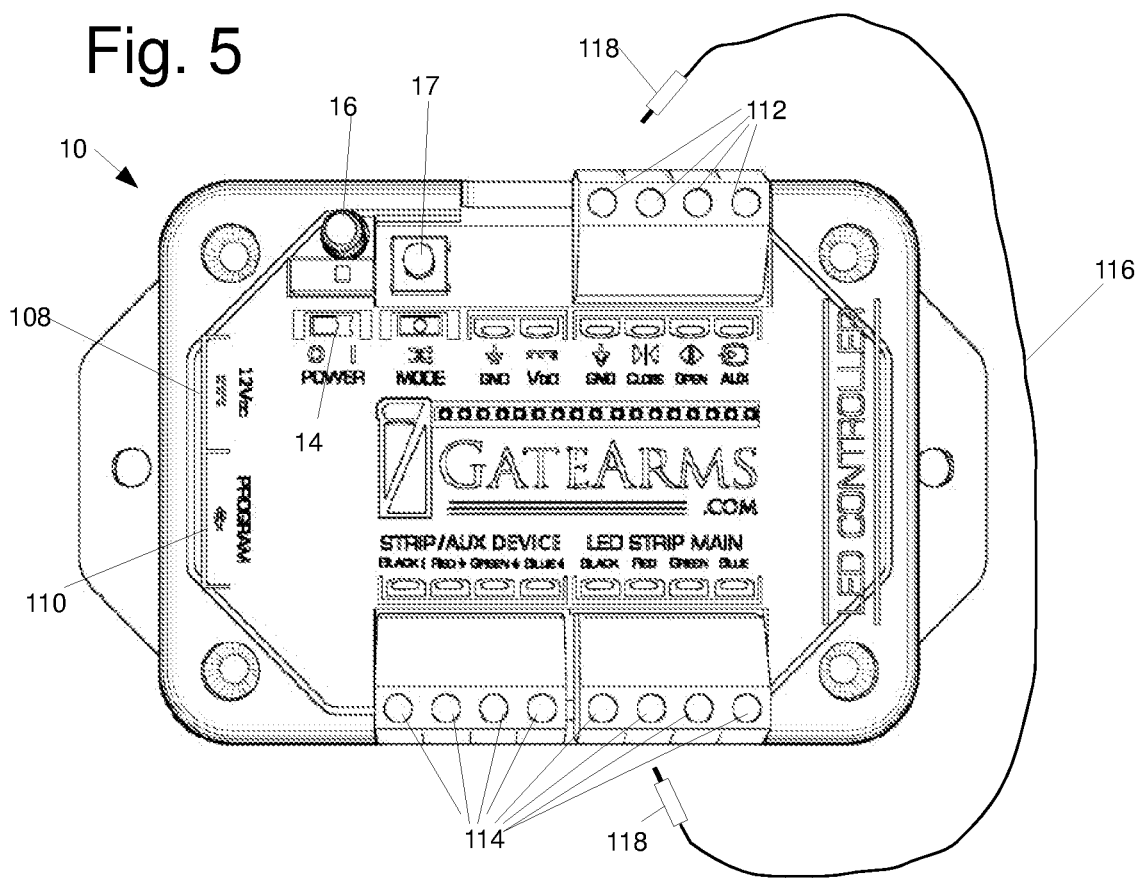
FIG. 5 is a top plan view of an LED controller in accordance with the principles of the invention.

In addition to being programmable by an interfacing computer device, such as a computer, tablet, smart phone or remote computer on a network, the device may be programmed manually. A computer illiterate operator may program the controller using only a jump wire. FIG. 5 shows another embodiment of a controller 100 in accordance with the principles of the invention. Controller 100 includes a power switch 102, a mode button 104, and in LED light indicator 106. The controller 100 receives power through power socket 108 and includes a USB port 110 for attachment to a computer, tablet, smart phone or other device capable of supporting software used to program the controller 100. The controller 100 also includes four input pins 112 and two sets of four output pins 114.

If an operator does not have a device capable of configuring software for operating the controller 100, or is not trained in using such software, the controller may be programmed using only one or two jump wires 116 having two connectors 118, one at each end. To manually configure the controller 100, an operator attaches the two connectors 118 of the jump wire to specific pins 112 or 114 and holds down the mode button 104 while turning the power on. When the mode button 104 is actuated, the controller 100 changes variables specific to the functions associated with the pins connected by the jump wires with the pins 112 or 114 connected by the jump wire 116. Add 116

For example, in one exemplary embodiment, where a gate arm includes an LED light strip on each side, the controller may be programmed with an operation profile including instructions for the two LED light strips to turn green upon receiving an open command (in "clone mode"), a controller is programmed using the following instructions:

1. Power off the Controller with the power switch.
2. Remove LED Strip(s) press-on header(s) from the LED Header(s)
3. Remove the signal wires' press-on header from the Signal header
4. Connect a jumper wire between LED AUX RED and signal header CLOSED
5. While holding the Mode button down, turn on the power switch
6. The LED light on the LED Controller will flash for 2 seconds, then turn off.
7. Turn off the Controller.
8. Remove jumper wire and turn on the controller.
9. Reconnect the LED header(s) and signal header.

In the same embodiment, the gate arm may be programmed to automatically change to red color after a predetermined amount of time. The controller may be programmed with an operation profile which include instructions to change the color pattern congruent with the motion of the gate arm, using the following method:

1. Power off the Controller with the power switch.
2. Remove LED Strip(s) press-on header(s) from the LED Header(s)
3. Jumper the SIGNAL CLOSE and LED STRIP MAIN GREEN together.
4. Hold down the MODE button and, while it's being held down, turn on the controller.
5. If done correctly, the status LED will flash at a steady pace. Let go of the MODE button.
6. At this point the controller is in "Timer Programming" mode. When the MODE button is pressed and held down, the LED controller will be recording the length of time that you hold the button down. It is immediately saved to memory once you let go of the MODE button.
7. Turn off the Controller.
8. Remove jumper wire and turn on the controller.
9. Reconnect the LED header(s) and signal header.

The dimming level of the controller may be programmed using the following instructions:

1. Remove LED Strip(s) press-on header(s) from the LED Header(s)
2. Remove the signal wires' press-on header from the Signal header
3. Connect a jumper wire between LED Main RED and signal header OPEN
4. While holding the Mode button down, turn on the power switch
5. The LED light on the LED Controller will flash for 2 seconds, then turn off. This indicates it is in "Programming Mode."
6. Turn LED Controller off with power switch.
7. Remove jumper wire
8. Connect the LED strip(s) and Signal Header
9. Turn LED Controller back on again.
10. Press and release the Mode button quickly. Each time that you press the Mode button, the LED strip will dim by 1 increment. There are 16 progressive dimming levels. After pressing the button 16 times, the light level will return to full brightness for another round of button pressing.
11. Once you're at the desired light level, turn the LED Controller off, then on again.

To reset programming to defaults, power the LED Controller on and hold the Mode button down for 3 seconds or more with no jumper wires attached.

The following charts provide specific methods and rules for programming a controller configured to operate specific types of devices commonly used for controlling access to a location.

Example 1 Barrier Arm, Swing and Slide Gate Profiles

The LED Controller can be used to control LED light strips affixed to barrier gate arms as well as swinging or sliding gates by using a configuration tool or by manually programming the LED controller with an appropriate gate operation profile.

In one embodiment of a barrier arm gate profile, the LED controller is preprogrammed with one or more operation profiles compatible with a gate operator control board from one or more standard equipment manufacturers such as for example Liftmaster®. An operator may choose a particular preprogrammed operation profile by toggling the mode button. Different preprogrammed profiles may be indicated by the speed with which the LED indicator light on the LED controller blinks. A first preprogrammed profile may be indicated by rapid blinking, a second profile indicated by slower blinking and a third profile indicated by even slower blinking. The first preprogrammed profile may be indicated by rapid blinking. The second preprogrammed profile may be indicated by slower blinking. The third preprogrammed profile may be indicated by even slower blinking or by a steady, constant light. Other colors may also be used to indicate different profiles.

A signal cable is used to provide electrical communication between the pins of the input port of the LED controller with corresponding output pins on the gate operator control board. Each output header of the LED controller can then be connected to an individual LED light strip. Each separate LED light strip may receive different commands based on various input signals. Input signals can include A/C, D/C, dry contact or other electrical signals. For example, the LED controller may have an operation profile configured to expect the incoming signal wires to rest at voltage, e.g. 10.5V for a Liftmaster® device, and to drop momentarily to ground to indicate signals.

Different pins on an input port may be used to identify different signals. For example, one of the pins of the input port may be specific to a signal for a barrier gate opening such that when the gate is opening a signal is received at that individual pin. Similarly, when the gate is closing, the pin designated for closing signals receives a signal. A particular operation profile of the LED controller will generate commands that will be sent to one or more LED light strips through the output ports in response to each of the signals.

Figure 6:
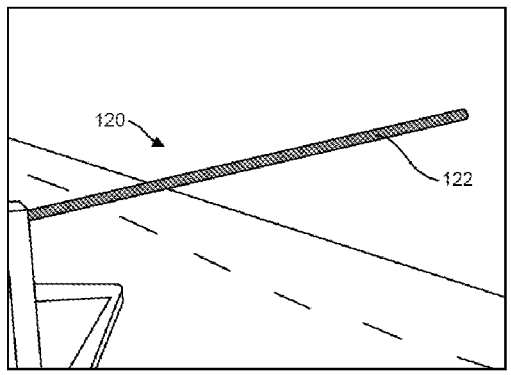
FIG. 6 is an environmental view of an gate arm having lights controlled by and LED controller in accordance with the principles of the invention.
Figure 7:
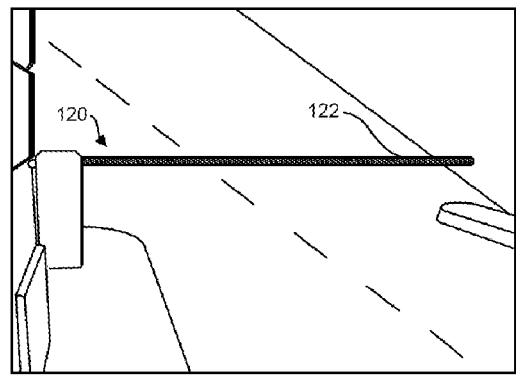
FIG. 7 is an environmental view of an gate arm having lights controlled by and LED controller in accordance with the principles of the invention.

FIGS. 6 and 7 show a gate arm 120 having an LED light strip 122 controlled by the controller 10. An exemplary embodiment of an operation profile for a gate arm logic is:
Opening—solid green
Fully open—solid green
Closing—solid red
Closed—solid red That is, when the gate arm 120 is opening or fully open as shown in FIG. 6, the LED light strip 122 emits green colored light. When the gate arm 120 is closing or fully closed as shown in FIG. 7, and LED light strip 122 emits red colored light. This example is of a relatively simple operation profile. An LED controller can instruct the LED light strips to emit a wide range of colors in a wide range of blinking patterns depending on the various signals received. When an addressable LED light strip is used, individual LEDs on the strip may receive different instructions regarding blinking pattern and color. For example, should a programmer choose, the LED controller can be configured with a runtime version of an operation profile providing sequential blinking of the LEDs along the LED strip to produce a "Knight Rider" or "Cylon" affect causing a red light to appear to move back and forth along the LED light strip.

There are many other applications for the LED controller and operation profiles in accordance with the principles of the invention, having several different features. A non-exhaustive list of applications for the barrier gate arm version of the invention include:

Standard Barrier Arms Road-blocking barrier arms used at HOAs, tollbooths, airports, parking, etc.

Highway Barrier Arms Road-blocking barrier arms used to block lanes of traffic, like tunnel, on-ramps, highway lanes.

Railway Crossings Road-blocking barrier arms used at railway crossings.

Swing Gates Road-blocking gate mounted and pivoting on a hinge on one side of the gate. LEDs can be positioned under gate facing roadway or on gate facing drivers and back side.

Slide Gates Road-blocking gate mounted on wheels that slides horizontally left-right. LEDs can be positioned on the fixed posts at left & right of gate openings or on the moving gate.

Pedestrian Doors Door for permitting foot traffic. LEDs can be positioned to warn other side of impending door opening, or can warn nearby security if door is left unclosed for extended time.

A non-exhaustive list of exemplary operation profile features that can be incorporated into profiles for gate arm applications includes:

Green light when barrier is up, Red light when barrier is down: LEDs change color depending on position of the gate. When it is appropriate for a driver to go, the LEDs turn green. Otherwise they are red, flashing red, or flashing amber.

2-way gate mode: LED Controller can be configured to control 2 LED strips inversely depending on which side triggers the gate to open. On a double-sided gate, regardless of which side is approached, that side turns green and the reverse side stays solid or flashing red.

Amber Pulse when Heavy Gate in motion: When a barrier gate and heavy gate/door are interlocked, the barrier stays down until the heavy gate is fully open, whereupon the barrier goes up. In this mode, the LEDs flash amber while the heavy gate is opening, and turn green when the barrier goes up. They are red when barrier goes down. If both the heavy gate and the barrier have controllers that are linked, their lighting patterns can be synchronized.

Automatic Close timers: The automatic close timer forces the LEDs to turn red after X seconds (set by Installer). The helps situations where a gate does not have a close device but rather closes by timer. The LED timer helps the installer to synchronize the LEDs to turn red just before the gate begins to descend.

Brightness control: The LED Controller can dim the LEDs via PWM. There are 255 levels of brightness programmable using a PC, 16 levels using a jumper wire.

Dimming on-command: LEDs can be dimmed on-command. When programmed to do so, the LEDs will dim to a preset programmable brightness level when the AUX signal pin is grounded. This way installers can use a dry-contact landscape timer or light sensor to trigger & reverse the dimming function.

Automatic light shut-off: This feature turns off the LEDs while the barrier is up or down after X seconds of inactivity. Useful for gates that are locked-open for extended periods of time (like all day while guard is on-duty). Or locked tight and closed like ranch gates on solar power.

Double-sided lights: Barrier arms can have LEDs on 1 side or both sides (facing toward and/or away from driver). The LED tracks are extruded into the aluminum arm.

Color-fading transition effect: This effect blends the red and green lights briefly when transitioning from one color to the other. This is much easier on human eyes and improves the pleasant appearance of the LEDs.

Selecting what colors to use: Installers can decide which colors to use instead of Green, Red or Amber.

Control with clickers and remotes: Some barrier operators have inputs for remote controls where user clicks once to open a gate, and a second time to close that gate. LED Controller has a mode to work with that scenario.

Change of color behavior such as red flashing while in motion: Normally LEDs transition from solid red to solid green upon receiving an open signal. LEDs can instead be programmed to flash red for X seconds before turning Green. This makes barrier arm flash red while in motion.

Can control external devices depending on condition of inputs: LED Controller can be programmed to treat the AUX LED header as a power supply for external devices like horns, klaxons, traffic lights, safety eyes or other safety devices, etc. Power can be continuous or pulsing depending on gate or door status, or user preferences.

Wiegand input device to control gate operation: LED Controller can be programmed to act as a temporary Wiegand-reading gate controller. Installer connects a Wiegand reader to LED Controller's signal header and connects Gate to LED header. Wiegand is recognized as the incoming data type, so LED Controller opens the gate (for any valid Wiegand input). This is a temporary work around for access control technicians at job sites.

Supports DC and AC signal voltages: By using the optional AC Signal Converters (2 models) installers can attach the normally DC LED Controller to an AC operator.

Supports Optical signaling: By using the optional Optical Signal Converter installers can attach the LED controller to indicator lights mounted or example on an operator. Using optical signals provides complete isolation from monitored systems.

Supports negative signal voltages: By using the optional AC Signal Converter Premium, installers can attach the normally positive DC-reading LED Controller to a negative voltage generating signal source.

Supports Pulse width Modulation (PWM) signals: The LED Controller can interpret signals even if they are pulsed (PWM) signals.

Supports fully isolated inputs: Using the optional AC Signal Converter Premium, users can connect to AC Signals that require full circuit isolation.

Supports limit switches and dry-contact relays: LED Controller can interpret signals that are dry contact in nature, triggering on either ground or disconnection signals, or voltage.

Controller can operate with limited information, such as only knowing "fully-open": LED Controller has ability to infer missing information and can function adequately with partial field data. Only knowing "fully-open" allows us to trigger green on Full-Open, otherwise be Red.

Can work with current draw instead of voltages if required: LED Controller can read current draw from a device and use that as a trigger, either when current is flowing or completely removed.

Supports wiring directly into an operator motor: LED Controller can be wired directly to an operator's drive motor to derive signal information regarding position or movement of a gate or door.

Many pre-made profiles exist for operators found in the field: The configuration tool for the LED Controller has many pre-written profiles for a variety of existing operator models.

Runtime versions of software compatible with the operating system of an LED controller and embodying different operation profiles may be constructed using a configuration tool in accordance with the principles of the invention. However, it is sometimes impractical to utilize a configuration tool. Therefore, the LED controller may also be programmed with an operation profile using a jump wire based on a menu of commands. For a Barrier Gate Arm an exemplary menu of programming functions usable to construct and operation profile may include some or all of the following:

|  | Program Method | Logic | Timer Mode | Description |
|---|---|---|---|---|
| Primary Modes |  |  |  |  |
| Standard | Mode button 3 sec | G/V, V/G, |  | Status LED Steady. Priority is set to Open. |
| Standard with Heavy Gate | Mode button 3 sec | G/V, V/G, V/G |  | Status LED Slow Blink. Priority is set to Open. |
| Dry Contact | Mode button 3 sec | N/G, N/G |  | Status LED Fast Blink. Priority is disabled. |
| Advanced Modes | Jump Wire Connections |  |  |  |
| Logic Inversion & Selection | GND → 1 or more signal inputs |  |  | Flips "Idles on/Triggers on" around for grounded signals. Also selects those ports. |
| Clear selection | No connections |  |  | Clears the selection of ports |
| Invert Logic & Selection | Black → Aux |  |  | Invert the liogic and selection. This is the same as GND → Open & Close & Aux |
| Toggle Dry Contact mode on selection | Black → Close |  |  | Toggles dry contact mode on/off on the previous selection made with ground |
| Enable Dry Contact mode | Blue → Open |  |  | A shortcut to enabling dry contact mode on all ports. Logic is overwritten. |
| Enter Logic Selection Mode: Clear Logic | Black → Aux & Open | V/G, V/G, V/G |  | Enter Logic Selection Mode (which is default). Also change logic. |
| Enter Priority Selection Mode: Clear Priority | Black → Aux & Close |  |  | Enter Priority Selection Mode. Also clears the priority flags. To set close priority, now perform GND → Close. |
| Direct-to-Motor | Black → Open | V/N, V/N |  | Enables signal invalidation to clean motor feedback, makes changes to the logic, and disables auto-close |
| Swing Gate Kit | Green → Open | G/N, G/N |  | Enables the swing gate profile. Solid green or red on respective limit switches. Blinking red on neither. |
| Disable Amber Blink on Heavy Open | Black → Close & Open |  |  | Reverts to the heavy gate behavior of version 3.x & 4.x. Stays red until heavy gate is opened. |
| Disable the Auto-Close Timer | Red → Close |  |  | Disable the auto-close timer |
| Disable Close Input | Blue → Aux, Red → Close |  |  | Disable the Close input. Best used in conjunction with the Auto-close timer feature. |
| Disable Open Input | Blue → Aux, Red → Open |  |  | Disable the Open input. Best used in conjunction with the Toggle Clicker on Aux. |
| Disable Open & Close Input | Blue → Aux, Red → Open & Close |  |  | Disable the Open and Close inputs. A shortcut for disabling both Close and Open at the same time. |
| Disable Transition Effect | Blue → Close |  |  | Disable the animated transition effect |
| Enable Toggle Clicker on Aux | Blue → Aux | —, —, G/V |  | When Aux is triggered, the state of the LED will toggle between Red and Green |

-continued

| | Logic | Timer Mode | Description |
|---|---|---|---|
| Enable Dim on Aux | Red → Aux | —, —, G/N | When Aux is triggered, both LED strips will dim to the configured brightness level. Default is ¼th brightness. |
| Blink on Movement & Configure Up time | Blue → Open, Green → Close | Up time | When enabled the LED will blink red when moving. Default is 3 seconds. Hold the mode button to specify the up time. |
| Blink on Movement & Configure Down time | Blue → Open, Red → Close | Down time | When enabled the LED will blink red when moving. Default is 3 seconds. Hold the mode button to specify the down time. |
| Blink on Movement & Configure Up & down time | Blue → Open, Red & Green → Close | Up & down time | When enabled the LED will blink red when moving. Default is 3 seconds. Hold the mode button to specify the up and down time. |
| Enable Green Fade-Out | Red → Close, Green → Open | Fade-out Time | When enabled, the green light stays on only for a short time. Default 5 seconds. Hold the mode button to specify a different time. |
| Enable Auto-Close & Configure Timer | Green → Close | Auto-close Time | When enabled, close will auto-trigger after a configured time. Default is 30 seconds. Hold the mode button to specify a different time. |
| Default to Green | Green → Open & Close | | When enabled, on power up the state of the LED will default to green behavior instead of red. |
| Always Dim LED Strip | Green → Aux | | When enabled, both LED will be dim to the configured brightness level. Default is ¼th brightness. |
| Configure the Brightness Level | Red → Open | (Special) | This setting will automatically enable the "always dim" feature. To configure the brightness, enter the programming mode Power cycle the controller, then tap on the Mode button to dim the LED strip. There are 16 steps before it cycles back. To accept the configuration, power cycle the control one more time. |
| Enable 8.5 V threshold | Red & Green → Close | | Increase the voltage threshold to 8.5 V. Note that the AC adapter and dry contact will not work on any ports. |
| External Device Control | Aux Red → Open | | Enable LED AUX to control external devices. Blue comes on when the heavy gate is opening. |
| Clone mode | Aux Red → Close | | Enable clone mode |

Example 2 Door Safety Profiles

Figure 8:
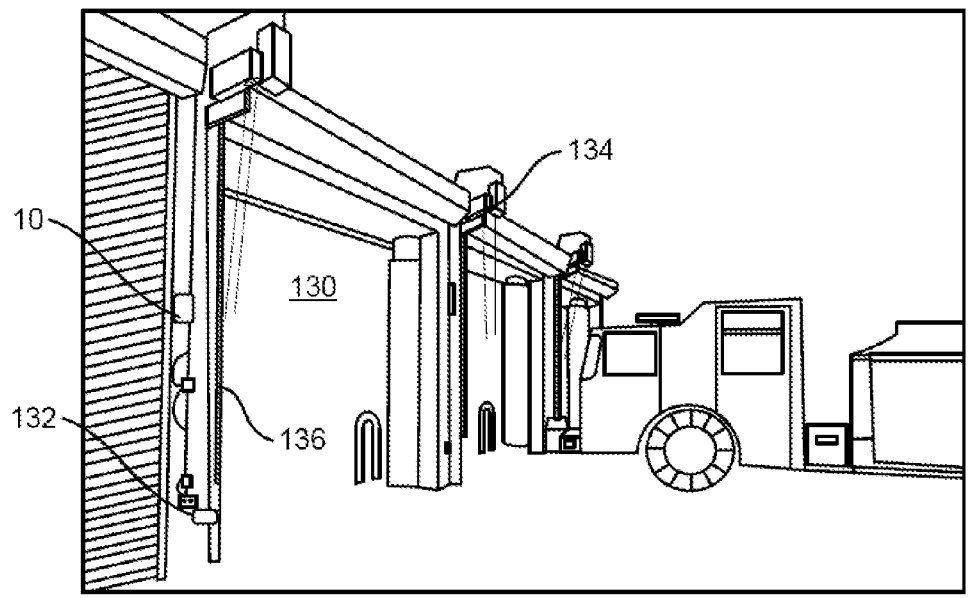
FIG. 8 is a perspective view of a garage door in the open position, having a LED controller and associated light system in a fire station in accordance with the principles of the invention.
Figure 9:
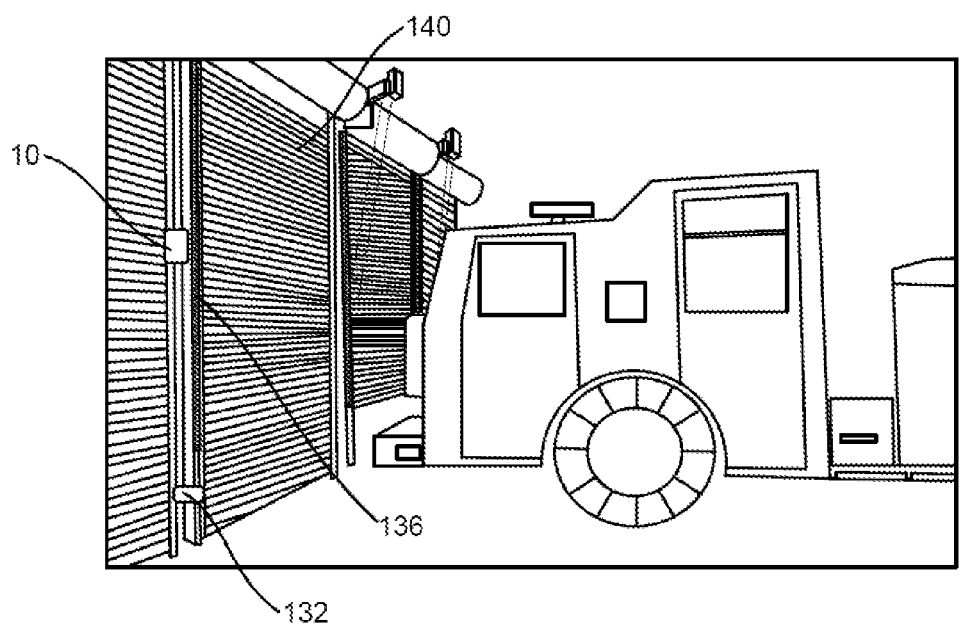
FIG. 9 is a perspective view of a garage door in a closed position, having a LED controller and associated light system in a fire station in accordance with the principles of the invention.

Another possible use of an LED controller is to control LED light signals positioned around a commercial garage door, for example a municipal fire station garage door 130 as shown in FIGS. 8 and 9. In this embodiment, the controller 10 is mounted adjacent to the garage door 130 and is preprogrammed with a modifiable machine code runtime version of a configuration profile preconfigured to receive signals from a door operator that raises and lowers a firehouse garage door. The profile is also preconfigured to receive signals from a photoelectric eye 132 that detects objects in the doorway when the garage door is open. Other safety devices may also optionally be used. A door safety profile is also preconfigured to produce light colors and sequences in one or more LED light strips controlled by the output connections of an LED controller. The LED controller to be programmed by the user in this example has three input signal receivers and four output connections. The preconfigured profile provides the following arrangements of input devices connected to input pins and output devices connected to output pins:

TABLE 1

| | |
|---|---|
| Input Receiver Pin 31 | Close Limit 134 |
| Input Receiver Pin 32 | Open Limit 132 |
| Input Receiver Pin 33 | Photoeye (non-monitored) |
| Output Connection Pin 36 | 12 VDC 5 A |
| Output Connection Pin 37 | On when fully-open |
| Output Connection Pin 38 | On when fully-closed |
| Output Connection Pin 39 | Always on, monitoring current draw |
| Output Connection Pin 41 | LED strip 12 VDC Out |
| Output Connection Pin 42 | LED Strip Red |
| Output Connection Pin 43 | LED Strip Green |
| Output Connection Pin 44 | LED Strip Blue |

As may be seen, in this profile the photoelectric eye is supplied power by the LED controller (pins 36 and 39) and signals indicating the presence of an object blocking the doorway are also received by the LED controller (pin 33). The door operator 134 provides limit switch signals indicating fully-open and fully-closed. Optionally, the power to these accessory systems may be provided by other power sources and the input pin 33 may be used to passively monitor the electronic circuits connecting the door operator 134 and electric eye 132. Those skilled in the art will appreciate that motors and electric eyes from different manufacturers provide different types of electronic signals.

Manufacturers use different voltage levels & use pulses of current to act as a "heartbeat" to verify that an electronic eye is functioning properly while not in use. A user of the present invention may modify the profile loaded on the controller 10 using the configuration tool to program the controller 10 to identify the correct signals at each individually addressable input pin.

In this embodiment, a preconfigured profile is configured to provide the outputs in response to input signals according to this table:

TABLE 2

| Door Position: | LED Light Output: |
| --- | --- |
| Door Open (from motor) | Solid Green |
| Door in Motion (from motor) | Flashing Red |
| Door Closed (from motor) | Solid Red |
| Door Blocked, Can't Close (from Photoelectric eye) | Flashing White slowly |
| Photoelectric eye not detectable | Flashing White fast |

In this profile, the LED controller 10 receives signals from the garage door motor indicating the position of the door. The LED controller 10 also receives signals from a photoelectric eye that detects objects in the doorway. The LED controller 10 recognizes the signals based upon the selections made by a user when modifying the operation profile using the configuration tool. The controller 10 produces output signals consisting of light colors and flashing patterns, which are also chosen by a user using the configuration tool to modify the profile based upon the equipment being utilized as well as user preferences. In FIG. 8, the garage doorway 130 is open and the LED light strip 136, controlled by the controller 10, emits green light. In FIG. 9, the garage door 140 has closed, covering the doorway 130 and therefore the controller 10 signals the LED light strip 136 to emit red light.

Accordingly, once the user has selected a preconfigured profile for the LED controller, the user may alter the input or output signals, or may add additional input or output signals. In this example, the user adds additional instructions relating to the photoelectric eye. The first modification is that when the photoelectric eye detects an object blocking the doorway, the LED light strip flashes white. After 20 seconds, if the doorway remains blocked, the lights flash white more quickly. After one minute, the lights flash white very quickly. For a second modification, the user takes advantage of the fact that the LED controller is capable of detecting voltage drops in its output connections, and is capable of selecting different colors for the LED lights to flash. The user adds the instruction that if the third output connection detects a drop in voltage, indicating that the photoelectric eye has ceased to operate, the LED lights will all flash white rapidly. The user may optionally select the LED lights to all flash purple when the photoelectric eye stops functioning properly. The user can therefore optionally utilize different colors to signal whether the photoelectric eye is detecting an object blocking the doorway or whether the photoelectric eye is not functioning properly.

The LED controller may optionally be programmed using the Mode button on the controller 10. Preinstalled configurations may be selected by holding down the Mode button (located next to the LED Controller power switch) for 3+ seconds. Repeating this will cycle between the 3 modes. The LED controller has a status LED which emits different blinking patterns for each of the preprogrammed modes. A first preprogrammed operation profile for an LED controller of this embodiment, in accordance with the principles of the invention, is:

| Open Signal | closed signal | Door status | LED color |
| --- | --- | --- | --- |
| Not Grounded | Not Grounded | Moving | Flashing red |
| Grounded | Not Grounded | Fully Open | Green |
| Not Grounded | Grounded | Fully Closed | Red |

If the door has a safety device such as an electric eye or laser presence detector installed, its output can be connected to the Aux Signal port of the LED Controller so that the LED strip can flash white when the safety is tripped (optional). For example, there can be a 20 second delay to trigger the safety eye to prevent unnecessary signals during normal use.

| Aux Signal | LED Strip Color | Door Status |
| --- | --- | --- |
| Not Grounded | Not Affected | Normal Operation |
| Grounded | Blinking White | Safety Eye Blocked |

In this embodiment, if the safety device can operate at 12 or 24 V D/C, it is possible to continuously monitor the device's existence and functionality by using the LED Controller as its power source. Simply attach the safety eye's power wire (positive) to the "AUX DEVICE/BLACK" terminal and its ground wire (negative) to the "AUX DEVICE/BLUE" terminal and use the correct profile setting. If the LED Controller notices an unusual drop in the current consumption of the safety device, the LED strip will flash white rapidly to indicate an unsafe malfunction condition of the safety device:

| Aux Signal | LED Strip Color | Door Status |
| --- | --- | --- |
| Higher than 10 mA | Not Affected | Normal Operation |
| Lower than 10 mA | Rapid Flash White | Safety Eye Disconnected |

Monitored Safety Configuration.

The Monitored Safety Configuration supports a "monitored" safety device (compliant with UL325) that puts out a heartbeat. If the heartbeat is lost, the LED strip will flash white rapidly to indicate an unsafe malfunction condition of the safety device.

| Aux Signal | LED Strip Color | Door Status |
| --- | --- | --- |
| 300 Hz pulse | Not Affected | Normal Operation |
| 300 ms pulse | Slow Flash White | Safety Blocked |
| No pulse | Rapid Flash White | Safety Disconnected |

In this configuration, the AUX DEVICE header is available for installation of an additional LED strip.

Half-Monitored Safety Configuration

Some monitored safety devices such as the Vitector do not put out a heartbeat while the safety is tripped. These special cases will require the use of the Half-Monitored Safety Configuration.

This mode works nearly exactly the same as the Monitored Safety Configuration except that the "Fast-Flash White" is disabled. This disables the ability to detect a power disruption or critical malfunction with the safety device unless you use the current sense feature.

Some door operators do not use circuit boards or provide output relays that can be used to determine fully-open and fully-closed statuses. We can connect directly to the motor control leads to determine door movement and direction.

A non-exhaustive list of profile features that can be incorporated into profiles for door controlling applications includes:

Garage doors: Commercial garage doors, including sectional, rolling steel, high-speed fabric, bi-fold.

Massive doors: Aviation/Space craft/Mining doors. Sometimes called MegaDoors®.

Fast doors/freezer doors: Fast opening/closing fabric doors for sealing freezers or clean areas to avoid loss of cooling or sanitary containment.

Special purpose doors.

Firetruck doors: Fire stations. Either "Back-In" (truck leaves/returns through same door) or "Pass-Through" (truck enters the "intake" door and exits the "outflow" door).

Safety equipment: System can serve as warning indication of approaching traffic at blind corners. Inside a factory, forklifts enter doors from both sides. Motion/Laser scanners on both sides are watching for an approaching forklift. When triggered, the LEDs on reverse side trigger to indicate danger (oncoming traffic). 2-4 Motion sensors devices approaching a dangerous intersection. Two controllers provide lighting for each intersecting lane and gives right of way to forklift arriving first, then the rest in sequence. Pulses amber when idle.

Special purpose vehicle entries; ex. Salt truck barriers: Large vehicles like dump trucks sometimes forget to put their truck-beds down all-the-way. They attempt to enter the building, but the truck-bed hits the top of the door frame. Our users install lasers to detect the bed-up condition and trigger LEDs to flash WHITE, indicating imminent danger of collision.

A non-exhaustive list of profile features that can be incorporated into profiles for door controllers includes:

Green light when door is up, red light when down, red flashing while in motion: Standard behavior.

Blue-light warning system: A laser scanner continuously checks whether a vehicle is already parked in the truck bay (with door closed). If vehicle is there, the exterior light is blue. Otherwise, red.

Supports pre-announce safety lighting for fast doors: LEDs flash amber during the preannounce (warning) interval (2-3 seconds), then flash red as the door descends.

Supports monitored safety devices and detection of safety malfunction: LED Controller is connected to the safety eye. In a UL325 monitored configuration, the LED Controller listens to the data stream and detects whether the safety beam has been disrupted. LEDs slow-flash white when beam is tripped. If the data stream disappears, the LEDs fast-flash white to indicate the safety eye is non-functional.

Supports unmonitored safety devices and detection of safety device malfunction: LED Controller is connected to the safety eye. In a non-monitored (pre-UL325) configuration, the LED Controller provides power and listens to the power line of the safety eye and detects whether the current draw has been disrupted. LEDs slow-flash white when the beam is tripped. The LED Controller provides a power source to the safety eye. If the power draw drops to zero, the LEDs fast-flash white to indicate the safety eye is non-functional.

The controller may be used to receive signals from and send signals to various industrial safety devices: Many safety devices are available, including safety eyes, lasers, motion detectors, metal detectors, etc. We can use the output signal(s) from these types of devices to change and/or flash the LED colors to notify users of a situation. When installing the controller, a user modifies the configuration profile of the controller such that it responds to whatever signals the user desires the controller to generate an output signal for. Thus, the controller works easily with ancient operators with legacy quirks and strange nonstandard behavior. This allows the controller the flexibility to develop unique and specialized solutions for connecting our LED Controller to a wide range of door operators, including those manufactured many decades ago that use complicated and esoteric switching technologies.

Lights can be programmed to shut off when idle: The inside and/or outside LED lights can turn OFF after X seconds of inactivity (door is fully-closed and/or fully-opened).

Public-facing lights are specifically designed for public consumption: The LED Controller can be configured to hide unnecessary feedback from public-facing light strips, such as the door is blocked or monitored safety failure.

Configurable timers: The LED Controller can trigger LED behaviors based on timers rather than limit-switch inputs. That allows the Controller to trigger the flashing red when the Open signal is received, and trigger the solid Green signal after a preset number of seconds (rather than upon reaching a fully-open limit switch).

Brightness control: The LED Controller can dim the LEDs via PWM. There are 255 levels of brightness programmable using a PC, 16 levels without a PC.

Color-fading transition effect: This effect blends the red and green lights briefly when transitioning from one color to the other. This is much easier on human eyes and improves the pleasant appearance of the LEDs, and makes it easier to detect the shift in color.

Decide what colors to use: Users can designate which color to use for each action, including fully-open, fully-closed, motion, and safety-eye tripped.

Change color behavior(s): Users can decide whether to flash the LEDs in various states such as moving up, moving down, fully-up, fully-down, safety-eye tripped, etc.

Control external devices depending on the condition of the door: The LED Controller can power third-party devices such as stoplights, horns, cameras, etc.

Supports DC and AC voltages: It can accept 12-24 VDC as load power. It can accept 2-30 VDC and 8-120 VAC for signals.

Supports negative voltages: It can accept negative signal voltages to −30 VDC and −120 VAC.

Supports PWM signals: It can decipher PWM signals coming from input sources.

Supports Optical signaling: By using the optional Optical Signal Converter installers can attach the LED controller to indicator lights mounted or example on an operator. Using optical signals provides complete isolation from monitored systems.

Supports fully isolated inputs: It can accept AC inputs that each require a dedicated power and dedicated neutral line. This allows complete separation of the LED Controller from the AC input source.

Supports limit switches and dry-contact relays: LED Controller can interpret signals that are dry contact in nature, triggering on either ground or disconnection signals or voltage.

Controller can operate with limited information, such as only knowing "open": LED Controller has ability to infer missing information and can function adequately with partial field data. Only knowing "fully-open" allows us to trigger green on Full-Open, otherwise be red.

Can work with current draw instead of voltages if required: LED Controller can read current draw from a device and use that as a trigger, either when current is flowing or completely removed.

Supports wiring directly into an operator motor: Controller can be wired directly to a door operator's motor and derive information on whether the door is Opening or Closing.

Many pre-made profiles exist for operators found in the field: Configuration Software Tool contains pre-written profiles for most door operators in use today.

If an operator chooses to manually enter the logic elements of a door safety operation profile, he or she may do so with a jump wire. For a Garage Door safety device an exemplary menu of programming functions usable to construct and operation profile may include some or all of the following:

| | Program Method | Logic | Timer Mode | |
|---|---|---|---|---|
| Primary Modes | | | | Status LED |
| Standard, Non-monitored Safety | Mode button 3 sec | G/N, G/N, G/N | | Steady |
| Standard, Monitored Safety | Mode button 3 sec | G/N, G/N, M | | Slow Blink |
| Direct-to-Motor with Safety | Mode button 3 sec | V/N, V/N, G/V | | Fast Blink |
| Advanced Modes | | | | Description |
| Logic Inversion & Selection | GND → 1 or more signal inputs | | | Flips "Idles on/Triggers on" around for grounded signals. Also selects those ports. |
| Clear selection | No connections | | | Clears the selection of ports |
| Invert Logic & Selection | Black → Aux | | | Invert the logic and selection. This is the same as GND → Open & Close & Aux |
| Toggle Dry Contact mode on selection | Black → Close | | | Toggles dry contact mode on/off on the previous selection made with ground |
| Enable AC Adapter | Blue → Open | | | Technically disables Dry Contact mode and performs logic inversion on all ports |
| Enter Logic Selection Mode: Clear Logic | Black → Aux & Open | V/G, V/G, V/G | | Enter Logic Selection Mode (which is default). Also change logic. |
| Enter safety color selection mode: Set amber flash | Black → Open & Close | | | Enter Color selection mode. Amber Flash is default. The next setting can be one of these: White Flash = GND → Open, Red = GND → Close, Green = GND → Open & Close |
| Standard, Partially monitored Safety | Red → Aux | G/N, G/N, M | | For half-monitored safety devices, this mode will disable the detection of safety disconnect |
| Operator: Manaras Digital Logic Board | Green → Aux | V/N, V/N, G/N | | For manaras-style digital logic boards where Open and Close trigger on voltage but safety is dry contact |
| Preannounce shortcut: 0 sec safety, amber flash | Red → Open | | | Use this to enable a preannounce on Aux in one step. Aux trigger will cause main lights to flash amber. |
| Configure Green Safety delay Timer | Red & Blue → Close | | Auto-close Time | Set how long the green light stays on before the safety kicks on. Default about 20 seconds. Hold the mode button to specify a different time. Maximum is 67 seconds. |
| Enable 8.5 V threshold | Red & Green → Close | | | Increase the voltage threshold to 8.5 V. Note that the AC adapter and dry contact will not work on any ports. |
| External Device Control (Blue = Safety) | Aux Red → Open | | | Enable LED AUX to control external devices. Blue comes on when Safety is triggered. |
| External Device Control (Blue = Moving) | Aux Red → Aux | | | Enable LED AUX to control external devices. Blue comes on when the door is moving. |
| Clone mode for inside lights | Aux Red → Close | | | Enable clone mode where Aux LED imitates Main LED. |
| Public mode for outside light on Aux LED | Green → Open | | | Enable public mode for Aux LED. Designed for outdoor LED strips in mind, only Red/Red Flashing/Green is supported. |

-continued

| | Program Method | Logic | Timer Mode | |
|---|---|---|---|---|
| Enable timed main LED shut-off & Set timer | Green → Close, Blue → Open | | Main LED Timer | Shut off main LED after solid red or green is on for longer than configured time. Default is 30 seconds. Hold the mode button to specify a different time. Can be used with clone mode. |
| Enable timed aux LED shut-off & Set timer | Red → Close, Blue → Open | | Aux LED Timer | Shut off aux LED after solid red or green is on for longer than configured time. Default is 30 seconds. Hold the mode button to specify a different time. Also enables public mode. |
| Enable timed main & aux LED shut-off & Set timer | Red & Green → Close, Blue → Open | | Both LED Timers | Shut off main and aux LED after solid red or green is on for longer than configured time. Default is 30 seconds. Hold the mode button to specify a different time. Also enables public mode. |

An exemplary alternative menu of programmable functions for a door safety operation profile is:

| | Program Method | Logic | |
|---|---|---|---|
| Primary Modes | | | Status LED |
| Standard, Non-monitored Safety | Mode button 3 sec | G/N, G/N, G/N | Steady |
| Standard, Monitored Safety | Mode button 3 sec | G/N, G/N, M | Slow Blink |
| Direct-to-Motor with Safety | Mode button 3 sec | V/N, V/N, G/V | Fast Blink |
| Advanced Modes | | | Description |
| Logic Inversion & Selection | GND → 1 or more signal inputs | | Flips "Idles on/Triggers on" around for grounded signals. Also selects those ports. |
| Clear selection | No connections | | Clears the selection of ports |
| Invert Logic & Selection | Black → Aux | | Invert the logic and selection. This is the same as GND → Open & Close & Aux |
| Toggle Dry Contact mode on selection | Black → Close | | Toggles dry contact mode on/off on the previous selection made with ground |
| Enable AC Adapter | Blue → Open | | Technically disables Dry Contact mode and performs logic inversion on all ports |
| Standard, Partially monitored Safety | Red → Aux | G/N, G/N, M | For half-monitored safety devices, this mode will disable the detection of safety disconnect |
| Operator: Manaras Digital Logic Board | Green → Aux | V/N, V/N, G/N | For manaras-style digital logic boards where Open and Close trigger on voltage but safety is dry contact |
| Operator: Liftmaster Elite series 3.0 | Blue → Aux | G/N, V/N, G/V | For L3 where the open limit switch behaves like a dry contact |
| Enable 8.5 V threshold | Red & Green → Close | | Increase the voltage threshold to 8.5 V. Note that the AC adapter and dry contact will not work on any ports. |
| External Device Control (Blue = Safety) | Aux Red → Open | | Enable LED AUX to control external devices. Blue comes on when Safety is triggered. |
| External Device Control (Blue = Moving) | Aux Red → Aux | | Enable LED AUX to control external devices. Blue comes on when the door is moving. |
| Clone mode | Aux Red → Close | | Enable clone mode |

Example 3 Truck Restraint Profiles

Figure 10:
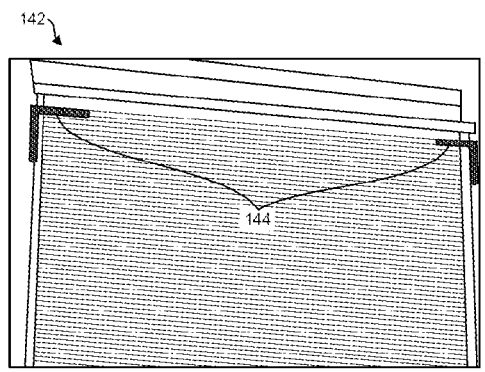
FIG. 10 is a perspective view of a garage door in the closed position, having an LED controller and associated light system linked to a truck lock in accordance with the principles of the invention.
Figure 11:
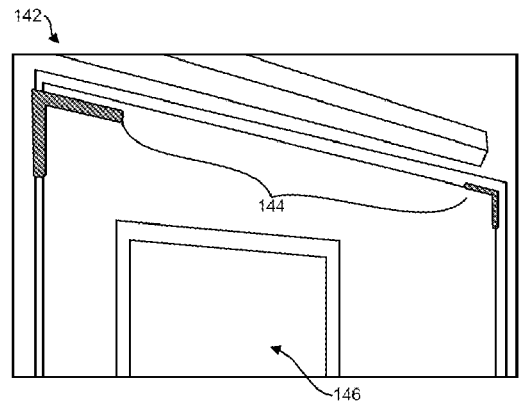
FIG. 11 is a perspective view of a garage door in an open position, having a LED controller and associated light system in linked to a truck lock in accordance with the principles of the invention.

In another embodiment, the LED controller is configured using a pre-prepared modifiable profile in the configuration tool to function as a restraint light system 142 shown in FIGS. 10 and 11. This profile is used to control LED lighting on both the outside and the inside of a garage door and a loading dock. The LED controller receives information at its inputs that signal the position of the garage door, dock leveler, and the current status of a truck restraint that secures the back of a truck to a loading dock. In FIG. 10, the garage door is closed and the truck restraint is not engaged, therefore the LED lighting strips 144 emit a red color. In FIG. 11, the garage door is open, and a truck 146 is engaged with the restraint and the dock leveler lip is deployed. Therefore, the controller signals the LED lighting strips 142 to emit a green color. Optionally, the LED controller may also be connected to a large monitor or screen that displays the messages in the description column of the table below. Table 3 illustrates the profile used in this embodiment.

TABLE 3

| Door & Leveler Lip | Truck Restraint | Light Colors | Description |
| --- | --- | --- | --- |
| Either not fully Open | Stored | Red | Door is not receiving trucks at this time LOW DANGER |
| Door Fully Open, Lip Extended | Engaged | Green | It is safe to load or unload the truck at this time |
| Either not fully Open | Engaged | Flashing Red | Warning: Restraint is engaged while door is not fully opened or leveler lip not extended. Perhaps door-creep or leveler not ready. HIGH DANGER |
| Door Fully Open, Lip Extended | Failed State/ Restraint Override | Flashing Amber | Warning: Restraint Override is enabled. Perhaps truck does not have restraint bar, or truck restraint was engaged too soon. MEDIUM DANGER |
| Either not fully Open | Failed State/ Restraint Override | Flashing Red | Warning: Restraint-fail AND door-creep or leveler problem. HIGH DANGER |

A user may optionally include an additional safety feature, where the LED controller includes instructions that the outside light will not turn green until five seconds after the dock lock is disengaged and it is safe for a truck to drive away. The user may also make any other desired modifications using the configuration tool or jump wire.

Optionally, a user may also create a profile from scratch, selecting what types of input signals are to be received on each of the input receivers. The user may then select what types of output signals are delivered by each of the output connections. The user may also optionally select whether the LED controller will monitor output voltage drops or other signals indicating a failure in one of the output devices.

A non-exhaustive list of profile features that can be incorporated into profiles for truck restraint devices for loading docks includes:

Corner Lights: LEDs installed in the corners of loading docks are wired into the truck restraint system. LEDs are green when restraint is engaged, amber when in override, flashing red when door is not fully open and/or when leveler not deployed. This color system communicates with the forklift drivers.

Outside Lights: LEDs can optionally be installed outside of a loading dock. These LEDs are wired into the truck restraint system and communicate with the truck drivers.

Leveler Sides: LEDs are installed on the sides of the loading dock leveler, next to and on top of the brush seal retainers. LEDs are optionally wired into the truck restraint light kit and match the corner lights when leveler is deployed. LED lights strips are on leveler side are red when the leveler lip is not deployed, and green when it is deployed.

Leveler-only docks: LEDs can be installed on loading docks with no truck restraint system. LEDs can be triggered based on the position of the dock leveler.

Proximity switches: LEDs can be triggered to flash red if a safety device is triggered. For example, a safety eye might sense a pedestrian walking past a loading dock, so the forklift backing out of a truck will be notified by the LED lights on the sides of the leveler.

A non-exhaustive list of profile features that can be incorporated into profiles for loading dock truck restraints includes:

Additional safety feature for outside light—5 second (programmable) delay before turning green: Optional exterior LED is programmed to remain Red for 5 seconds (programmable) past the restraint release moment. This adds a pause, improving safety.

Adds value to the existing truck restraint system by warning of dangerous door creep: Optional integration with door's fully-open limit switch allows detection of a loading dock's door position. If door leaves fully-open position, green lights revert to red-flashing to warn forklift that he might hit the door.

If leveler light kit is included (optional), the truck restraint and leveler must both be deployed for LEDs to turn green. Otherwise LEDs are red.

Brightness control: The LED Controller can dim the LEDs via PWM. There are 255 levels of brightness programmable using a PC, 16 levels without a PC.

Automatic light shut-off: This feature turns off the LEDs after X seconds of inactivity. Useful where clients want LEDs to work when a loading dock is in-use, but turn off when dock is idle.

Color-fading transition effect: This effect blends the red and green lights briefly when transitioning from one color to the other. This is much easier on human eyes and improves the pleasant appearance of the LEDs, and it is easier to detect color shifting when a transition effect is included.

Customizable colors: Installers can decide whether LEDs flash amber or flash alternating green & red. This option allows our lights to match the restraint's panel lights.

Supports DC and AC voltages: By using the optional AC Signal Converters (2 models) installers can attach the normally DC LED Controller to an AC truck restraint.

Supports negative voltages: By using the optional AC Signal Converter Premium, installers can attach the normally positive DC-reading LED Controller to a negative voltage generating signal source.

Supports PWM signals: The LED Controller can interpret signals even if they are pulsed (PWM) signals.

Supports Optical signaling: By using the optional Optical Signal Converter installers can attach the LED controller to indicator lights mounted or example on an operator. Using optical signals provides complete isolation from monitored systems.

Supports fully isolated inputs: Using the optional AC Signal Converter Premium, users can connect to AC Signals that require full circuit isolation Supports limit switches and dry-contact relays: LED Controller can interpret signals that are dry contact in nature, triggering on either ground or disconnection signals or voltage.

Can use current as a signal

Controller can operate with limited information, such as only running off of restraint-engaged signal. LED Controller has ability to infer missing information and can function adequately with partial field data.

Many pre-made profiles exist for truck restraint panels found in the field: The configuration tool for the LED Controller has many pre-written profiles for a variety of existing restraint models.

If an operator chooses to manually enter the logic elements of a truck restraint operation profile, he or she may do so with a jump wire. For a truck restraint system an exemplary menu of programming functions usable to construct and operation profile may include some or all of the following:

|  | Program Method | Logic | Timer Mode | Description |
|---|---|---|---|---|
| Primary Modes |  |  |  |  |
| Standard —Dry Contact | Mode button 3 sec | G/N, G/N, G/N |  | Status LED Steady |
| Standard —A/C Signal Converter | Mode button 3 sec | V/G, V/G, V/G |  | Status LED Slow Blink |
| Attached directly to flashing lights | Mode button 3 sec | G/N, V/G, V/G |  | Status LED Fast Blink. Signal Release of 750 ms for Close and Aux. |
| Advanced Modes |  |  |  |  |
| Logic Inversion & Selection | GND → 1 or more signal inputs |  |  | Flips "Idles on/Triggers on " around for grounded signals. Also selects those ports. |
| Clear selection | No connections |  |  | Clears the selection of ports |
| Invert Logic & Selection | Black → Aux |  |  | Invert the liogic and selection. This is the same as GND → Open & Close & Aux |
| Toggle Dry Contact mode on selection | Black → Close |  |  | Toggles dry contact mode on/off on the previous selection made with ground |
| Enable Dry Contact mode | Blue → Open |  |  | A shortcut to enabling dry contact mode on all ports. Logic is overwritten. |
| Enter Logic Selection Mode: Clear Logic | Black → Aux & Open | V/G, V/G, V/G |  | Enter Logic Selection Mode (which is default). Also change logic. |
| Select Trigger Color for Close | Blue → Open, Green → Close |  |  | Enter Color selection mode. Amber Flash is default. The next setting can be one of these: Red Flash = GND → Open, Red = GND → Close, Green = GND → Open & Close |
| Select Trigger Color for Aux | Blue → Open, Green → Aux |  |  | Enter Color selection mode. Amber Flash is default. The next setting can be one of these: Red Flash = GND → Open, Red = GND → Close, Green = GND → Open & Close |
| Select Trigger Color for Close & Aux | Blue → Open, Green → Close & Aux |  |  | Enter Color selection mode. Amber Flash is default. The next setting can be one of these: Red Flash = GND → Open, Red = GND → Close, Green = GND → Open & Close |
| Attached directly to PWM flashing lights | Black → Open | G/N, V/G, V/G |  | Same as 3rd primary mode except with 0 ms trigger of Close and Aux |
| Disable Aux Input | Blue → Aux, Red → Close |  |  | Disable the Aux input when only the Close input is being used. |
| Disable Open Input | Blue → Aux, Red → Open |  |  | Disable the Open input for doors without limit switches |
| Disable Transition Effect | Blue → Close |  |  | Disable the animated transition effect |
| Enable Current Sense (Green on Load) | Red → Close |  |  | Enables a proximity switch to be attached between AUX Black and AUX Blue so that Green comes on when the Prox switch light is on. |

-continued

| Program Method | Logic | Timer Mode | Description |
|---|---|---|---|
| Enable Current Sense (Green on Release) | Green → Close | | Enables a proximity switch to be attached between AUX Black and AUX Blue so that Green comes on when the Prox switch light is off. |
| Enable 8.5 V threshold | Red & Green → Close | | Increase the voltage threshold to 8.5 V. Note that the AC adapter and dry contact will not work on any ports. |
| Clone mode | Aux Red → Close | | The LED AUX port is intended for the door leveler |

Example 4 Monitoring Module

In another embodiment, the LED controller is not limited to controlling LED light systems. The LED controller is much broader than the name suggests. This embodiment is a "system on a module" that functions as a passive listening diagnostic tool that may readily be retrofitted onto existing devices, even devices that existed long before there were computers.

In this embodiment, the controller is placed in parallel with existing electrical wiring used to power a variety of devices, including photoelectric eyes, motors for raising and lowering garage doors and motors for operating a pivoting gate arm. The controller monitors the voltage, intensity, cycle speed, and periodicity of the electrical currents it passively monitors. This information is utilized to detect problems before they happen. For example, if the controller detects a slowly increasing voltage on a motor, this typically indicates that something is impeding movement of the device operated by the motor. This type of signal may therefore be used to send an alert to a maintenance team to investigate the source of the problem. Similarly, photoelectric eyes typically emit beams of infrared light at regular intervals. If the frequency of the light emissions changes, this may signal an impending failure of the photoelectric eye. Similarly a drastic voltage drop detected in a photoelectric eye may indicate that the photoelectric eye has ceased to function properly and must be replaced or repaired.

The controller may also be designed to learn over time. For example, it may be inserted into existing circuitry to passively monitor the current in a variety of mechanical devices. It may be programmed to identify normal, "healthy" frequencies, currents and periodicities. Once healthy patterns are identified, the controller may then generate alerts when any of these characteristics change.

In addition, the controller may be modified to include a connection that allows it to upload the information it monitors onto a remote server. Software in the remote server may then be used to analyze the uploaded raw data. The cloud-based software may be connected to several different controllers, all monitoring similar systems. When information regarding problems, breakdowns, and maintenance of the monitored systems is incorporated into the cloud-based software, the entire system may be utilized to identify patterns found in electrical systems prior to the occurrence of different types of failures. This allows the entire system including the cloud-based software to learn over time and increase efficiency of the maintenance of the systems it monitors.

Example 5 Autonomous Programmable Light Strip

Figure 12:
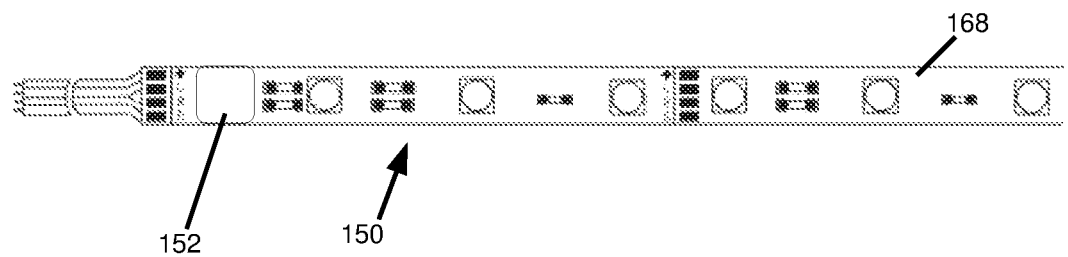
FIG. 12 is a top plan view of an autonomous light strip in accordance with the principles of the invention.
Figure 13:
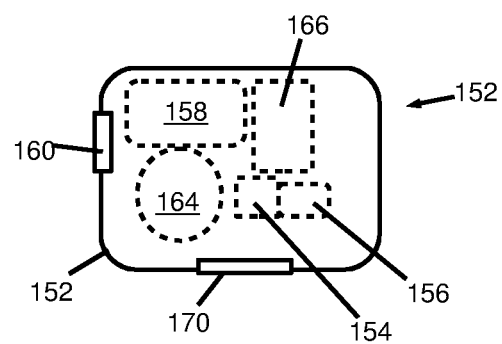
FIG. 13 is an enlarged view of a controller for an autonomous light strip in accordance with the principles of the invention.

FIGS. 12 and 13 show an autonomous programmable light strip 150 that may be retrofitted onto a gate arm, garage door or similar device in accordance with the principles of the invention. The autonomous light strip 150 operates independently and requires no communication with another device in order to function. The autonomous light strip 150 includes a LED light strip 168 attached to a small controller 152 having an accelerometer 154 that detects when the light strip moves, and an orientation module 156 for detecting the orientation of the light strip and/or the direction to the ground in relation to the controller itself. The accelerometer 154 may optionally simultaneously function as the orientation module when it detects the direction of acceleration. The autonomous light strip 150 is controlled by a microchip 166 in the controller 152 which may be programmed to produce several different lighting patterns in response to motion of the device to which it is attached and its orientation. For example, the autonomous light strip 150 may be affixed to a barrier gate arm and programmed to emit continuous green light when the door or gate is open, a continuous red light when the door or gate is closed, a flashing red or amber light when the door or gate is rising and a flashing red light when the door is lowering. The controller also includes a power source 158, which in this embodiment is a rechargeable battery. Optionally, a disposable or rechargeable battery may be used. Also optionally, the autonomous light strip 150 may include a socket 160 for receiving power from an exterior power supply. In this embodiment, both an internal power source 158 and a power socket 160 are included. The controller 152 may also include an induction charge module 164 that allows its power supply to be recharged without being directly connected to another device. An inductive charging device may be placed next to a gate or alongside the opening to a garage door. The battery may then be positioned such that it lies flush with the charging device when at rest in the lowered/closed position.

Optionally, The controller 152 also includes an interface 170 for sending and receiving messages to an electronic device such as a computer, tablet or smart phone. In this embodiment, the interface 170 is a transmitter for connecting via Wi-Fi, Bluetooth®, NRF or other wireless methods. Optionally, the interface 170 can be a USB port such as the one shown in FIG. 5. Inputs 1 and 2 can be used to input some configuration details. The embodiment shown in FIG. 12 has a controller 152 that is wider than the LED light strip 168. Optionally, the controller 152 can be the same width as the LED light strip 168, or embedded within the LED light strip.

Example 6 Adaptable Security Access Controller

An adaptable security access controller is an industrial-grade IoT ("Internet of Things") Door Controller, or "IDC." As used herein, IDC refers to a security device for controlling and monitoring remote doors and/or gates. In a first embodiment, the IDC communicates to a secure cloud server via ethernet or cellular technology for clearance, authentication, programming and management. The device provides an easy to use interface for real-time communication to third party access management systems. It supports data-link interfaces for access control devices such as magnetic card and RFID readers. It can also trigger magnetic door locks for allowing or preventing entry. The device monitors the opening and closing of doors, and can notify users or systems in various programmable circumstances. The IDC can also drive addressable multi-colored LED strips to provide visual feedback to the door user. A second embodiment IDC includes all of the functionality and components of the first embodiment IDC, but has additional components such as for example additional input and output pins.

The IDC sends all data to a secure cloud server, running a web service. The web service routes that data to the appropriate recipient. Diagnostic data streams to a database service, which receives, parses and stores that data. Access control data can optionally be streamed to a third-party management system, where the request can be analyzed. The third-party management system responds to the request with a command to open, deny open, or lock the door. That response is sent back to the web service, which supports standard web protocols and custom proprietary protocols if required. The web service then relays the door command to the originating IDC. Optionally, the IDC can include additional storage capacity to house a local copy of an access control list or database for operating a controlled access door. Optionally, the IDC may be configured to send and receive signals in one or both of alternating current and direct current.

In the first embodiment, the device includes two input ports, allowing use of two access control devices, for regulating both sides of a door separately. It can control two LED strips for status notifications on both sides, and can use a cellular network interface. Optionally, the IDC includes additional input ports for access control devices, as well as diagnostic input header pins. It controls multiple LED strips for user feedback, and has output pins for triggering third-party devices like surveillance cameras. The IDC also optionally includes Power-Over-Ethernet jacks that the IDC and its subordinate devices can be powered through the network cable and are not reliant on local power sources.

The first embodiment includes a total of five input pins. Two input pins can be used for Weigand®, serial, clock & data or other communication protocols. The first embodiment also includes three analog input pins that can be used for dry contacts or binary signals. These pins may be used for forced-entry detection. The first embodiment includes seven output pins. Three output pins are used for power, ground and data. The other four output pins include first and second dry contact relays.

A second embodiment of an IDC includes the same five input pins found on the first embodiment. An additional six input pins can be connected to open and close signal ports, door operator motor ports, and other diagnostic landing spots for detecting voltage, amp draw and/or other performance metrics. The second embodiment of the IDC also includes three output pins for power, ground and data, and four output pins include first and second dry contact relays. The second embodiment of the IDC includes additional output pins that can trigger cameras, horns, audio signals, microphones, lights, magnetic locks and other ancillary devices. Those skilled in the art will appreciate that additional embodiments may include additional input and output pins.

An IDC in accordance with the principles of the invention may include desirable safety features such as monitoring power consumption of connected devices. For example, garage doors, access gates and other large or heavy devices are often fitted with an electronic eye that detects the presence of an object in a door's path. If an object blocks the path of the electronic eye, the door will not obey a command to close until the object is removed. However, when a door does not close, or another device fails to function, it is not clear whether the device has failed or whether an object is in the way. Furthermore, if the electronic eye malfunctions, it will not send a signal blocking a command close the door. As a result, the operator of a system may not realize that the electronic eye has malfunctioned, and will not realize that there may be a danger that the door will close on an obstructing object. The IDC of the present invention monitors the power consumption of an electronic eye and sends a signal such as a blinking light or audio alarm when the power consumption of the electronic eye substantially drops below a certain level. This will alert a system operator that the electronic eye is inoperative and that the pathway of a door or other device must be manually checked before closing.

The IDC may also monitor power consumption of other devices, including other safety devices. For example, it is common for a truck dock at a warehouse to utilize a truck lock which engages and secures in place a trailer to the truck dock. A warehouse also may include a dock leveler, which is a small platform at a truck dock that raises or lowers its height to match that of a trailer. Both the truck lock and the dock leveler ensure that a trailer is secure and stationary at a particular truck dock and that a level path exists between the floor of the warehouse and the trailer. This prevents injury to forklift operators and other employees during the loading and unloading of a trailer.

These devices often include lights that blink or illuminate green when the device is properly engaged to a trailer, and blink or illuminate red when a trailer is not secure. By observing the green and red light signals, or other signals generated by the safety devices, employees are kept safe and material is not damaged. However, if one or more of these devices and/or the signaling system connected to them fail, the failure may not be apparent to a person in the vicinity.

The IDC of the present invention is connected to both a truck lock and lights that signal whether the lock is engaged. The IDC also monitors power consumption of the truck lock and or lighting systems and signals when one or more of them fail. Similarly, the IDC monitors power consumption of a dock leveler and may indicate via blinking lights or other visual or auditory signals that a device has malfunctioned. For example, a truck lock and one or more LED light strips may be connected to the IDC. When the truck lock is engaged to a trailer, the lights illuminate a continuous green light. When the truck lock becomes disengaged, the light strips may illuminate a continuous red color. If the IDC detects power loss or other malfunction in the truck lock, it will cause the LED light strips to flash red, thereby indicating that there has been a malfunction. The IDC may optionally send a signal to an audio device such as a horn, causing it to emit an audio signal.

The IDC may interface with a computer, tablet, smart phone or other device by means of a USB port. The USB port may be used to program the IDC based on the types of devices used. Optionally, the IDC may also interface using a Wi-Fi signal, Bluetooth®, radio or other signaling methods to a computer network, allowing signals and instructions to be sent to the IDC from a remote location.

Figure 14:
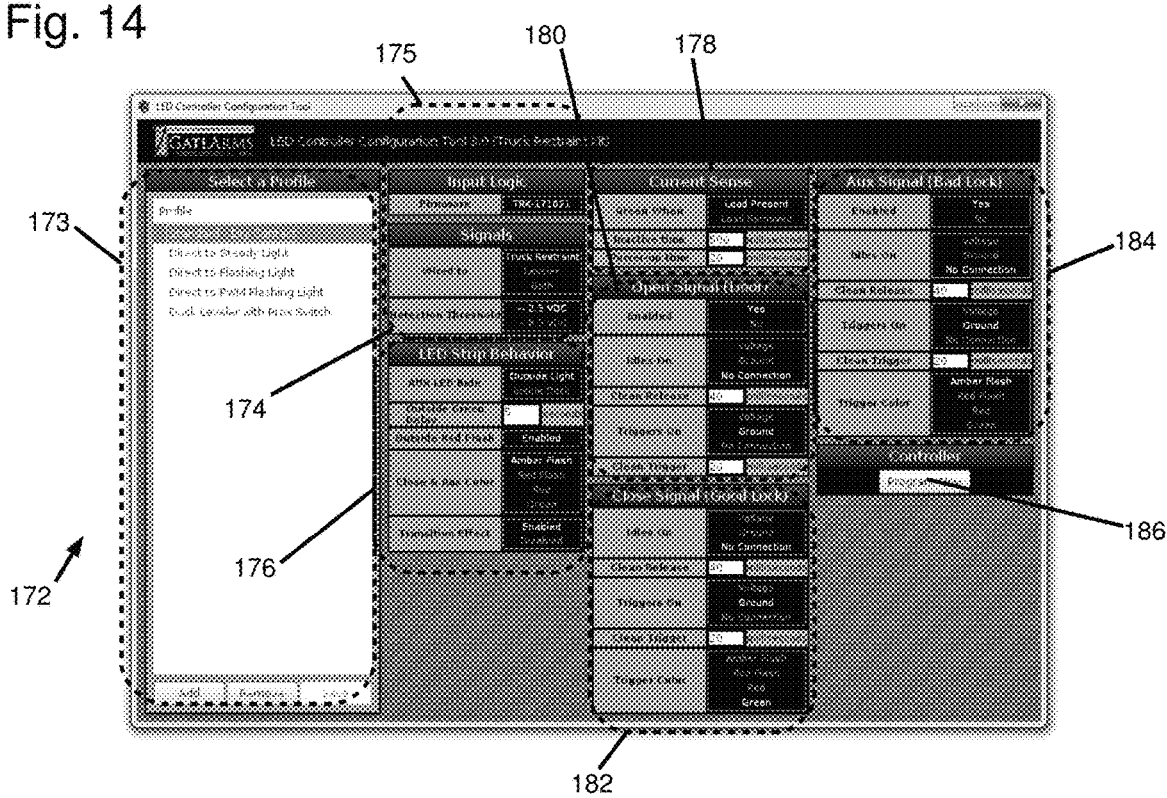
FIG. 14 is an alternative embodiment of a graphic user interface of a configuration tool for an LED controller in accordance with the principles of the invention.

FIG. 14 shows an alternative embodiment of a graphic user interface 172 of the configuration tool, in accordance with the principles of the invention. In this embodiment, the user interface 172 identifies the particular configuration tool as "LED Controller Configuration Tool 3.0 (Truck Restraint Kit)." When the configuration tool is run on a mobile device, such as a laptop, tablet or smart phone, and is connected to the controller through a USB port or wirelessly, it may display one or more specific graphic user interfaces, according to the type of LED lighting system it is used to control. The graphic user interface 172 as it appears when connected to controller 10 via USB port 20 and the truck restraint/dock leveler mode is selected. In this embodiment, the graphic user interface 172 displays the programming and programming options for use with a truck restraint and/or a dock leveler. The Profile Selection box 173 allows the user to select from one or more basic profiles. In this example, the user has selected the profile titled "Standard—Dry Contact." The Input Logic box 175, indicates the "TRK-171021" firmware has been selected. The Signals Box 174 indicates that the user has selected the Truck Restraint as the device to which the input signals are connected, as opposed to the Leveler or both devices, and the detection threshold is 2.5 VDC. As with all of the fields in the user interface 172, the user may toggle or scroll between the different options. The LED Strip Behavior box 176 indicates that the auxiliary LED light strip is the "Outside Light" as opposed to the "Inside Dock" light system. The LED Strip Behavior box 176 also indicates that the user has selected a five second delay for the strip to turn green, that the outside red flashing signal has been enabled and that the color to display when closed is a flashing Amber. The Current Sense box 178 indicates that the LED lights will turn green when a load is detected in the truck restraint, that the truck restraint is considered inactive after 500 ms and requires 20 ms to power up. The Open Signal (Door) box 180 indicates that the controller 10 is enabled to detect that the door is open and idles when there is no connection. The open signal is triggered on when the controller 10 detects a ground signal. The Close Signal box 182 indicates that a close signal remains idle when there is no connection and is triggered when it detects a ground signal, at which time the LED light strip turns green. The Aux Signal box 184 indicates that it is enabled to detect a bad lock, idles when there is no connection, triggers on when it detects a ground signal and the LED lights flash Amber when it is triggered. To apply this profile to the controller 10, the user clicks on the Program Now button 186.

Figure 15:
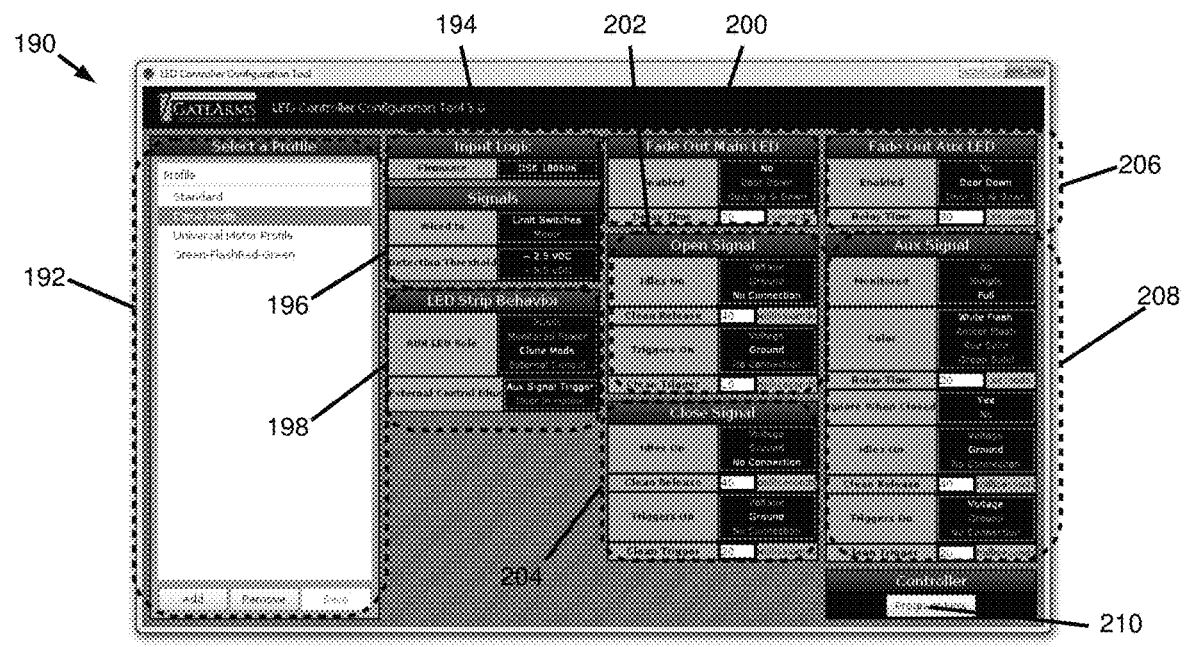
FIG. 15 is another alternative embodiment of a graphic user interface of a configuration tool for an LED controller in accordance with the principles of the invention.

FIG. 15 shows an another alternative embodiment of a graphic user interface 190 of the configuration tool, in accordance with the principles of the invention. In this embodiment, the user interface 190 identifies the particular configuration tool as "LED Controller Configuration Tool 3.0." When the configuration tool is run on a mobile device, such as a laptop, tablet or smart phone, and is connected to the controller through a USB port or wirelessly, it may display one or more specific graphic user interfaces, according to the type of LED lighting system it is used to control. The graphic user interface 190 as it appears when connected to controller 10 via USB port 20 and the garage door mode is selected. In this embodiment, the graphic user interface 190 displays the programming and programming options for use with a truck restraint and/or a dock leveler. The Profile Selection box 192 allows the user to select from one or more basic profiles. In this example, the user has selected the profile titled "Clone Mode." The Input Logic box 194, indicates the "DSK 180606" firmware has been selected. The Signals Box 196 indicates that the user has selected limit switches as the device to which the input signals are connected, as opposed to a motor, and the detection threshold is 2.5 VDC. As with all of the fields in the user interface 190, the user may toggle or scroll between the different options. The LED Strip Behavior box 198 indicates that the auxiliary LED light strip role is to clone the behavior of another LED light strip and is governed by an auxiliary signal trigger.

The Fade Out Main LED box 200 indicates that this option is not enabled. The Open Signal box 202 indicates that the controller 10 is enabled to detect that the door is open and idles when there is no connection. The open signal is triggered on when the controller 10 detects a ground signal. The Close Signal box 204 indicates that a close signal remains idle when there is no connection and is triggered when it detects a ground signal. The Fade Out AUX LED box 206 indicates that this function is activated when the door is down. The Aux Signal box 208 indicates the LED light strip will flash white when a full signal is monitored, and ignores signals when the door is closed, is triggered by a voltage and idles when a ground signal is detected. To apply this profile to the controller 10, the user clicks on the Program Now button 186.

Whereas, the present invention has been described in relation to the drawings attached hereto, other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A light system controller comprising:
a programmable system on a chip;
an input pin header having individually addressable input pins;
a main output pin header having individually addressable output pins;
an auxiliary output pin header having individually addressable output pins;
an input device in electrical communication with at least one of the individually addressable input pins of the input header, wherein the at least one input pin receives an input signal from the input device;
a main output device in electrical communication with at least one of the individually addressable output pins of the main output pin header and which is actuated upon receipt of an output signal through at least one of the output pins;
an operation profile which, upon receiving the input signal, transmits an output signal associated with the received input signal to the main output device through the at least one of the output pins;

wherein the operation profile is capable of being created by a software configuration tool, compiled into a machine code runtime version, and loaded onto the system on a chip, wherein the output signals associated with the input signals are capable of being reconfigured by disconnecting the input device from the input header, connecting one of the input pins to the one of the ouput pins with a jump wire, and disconnecting the jump wire prior to reconnecting the input device; and, wherein each of the input pins is capable of detecting a signal selected from the group consisting of a voltage level, a current level, a dry contact, a deviation from a predetermined voltage, a deviation from a predetermined current and a variable amplitude signal characterized by a Fourier series.

2. The light system controller of claim 1 wherein the configuration tool is installed on a mobile device in communication with the system-on-a-chip.

3. The light system controller of claim 2 wherein the configuration tool further comprises a graphic user interface displayed on the mobile device; and, wherein the graphic user interface displays a list of each of the one or more input pins, and the type of input signal each input pin is currently selected to receive.

4. The light system controller of claim 3 wherein the the main and auxiliary output devices include at least one LED light strip mounted on a gate arm.

5. The light system controller of claim 1 wherein the input device controls the operation of an access gate.

6. The light system controller of claim 1 further comprising:
a power button on the controller;
a mode button on the controller;
an auxiliary output header on the controller having individually addressable auxiliary output pins; and, an auxiliary output device in electrical communication with at least one of the auxiliary output pins;
wherein reconfiguring the output signals associated with the input signals comprises the steps of:
a) switching off power to the controller and terminating the electrical communication with the input device;
b) placing one of the input pins in direct electrical communication with a selected auxiliary output pin of the auxiliary output header using a jump wire;
c) actuating the mode button while switching on the power button;
d) switching the power button off;
e) removing the jump wire and re-establishing the electrical communication with the input device; and,
f) placing an auxiliary output device in electrical communication with the selected output pin.

* * * * *